United States Patent
Huang et al.

(10) Patent No.: US 11,737,042 B2
(45) Date of Patent: Aug. 22, 2023

(54) METHOD AND APPARATUS FOR UE TA REPORTING IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/981,227

(22) Filed: Nov. 4, 2022

(65) Prior Publication Data
US 2023/0164720 A1   May 25, 2023

Related U.S. Application Data

(60) Provisional application No. 63/283,250, filed on Nov. 25, 2021.

(51) Int. Cl.
*H04W 56/00* (2009.01)
*H04W 24/10* (2009.01)

(52) U.S. Cl.
CPC ....... *H04W 56/0045* (2013.01); *H04W 24/10* (2013.01)

(58) Field of Classification Search
CPC ............ H04W 56/0045; H04W 24/10; H04W 56/0005; H04W 24/08; H04W 56/00; H04W 74/0833; H04W 72/20; H04W 74/002; H04W 74/004; H04J 11/0053
See application file for complete search history.

(56) References Cited

U.S. PATENT DOCUMENTS

| | | | |
|---|---|---|---|
| 11,388,690 B1 * | 7/2022 | Bai | H04W 56/0045 |
| 11,528,676 B2 * | 12/2022 | Medles | H04W 72/21 |
| 11,564,191 B2 * | 1/2023 | Park | H04W 56/0045 |

(Continued)

FOREIGN PATENT DOCUMENTS

| | | |
|---|---|---|
| WO | 2021163889 A1 | 8/2021 |
| WO | 2021230815 A1 | 11/2021 |

OTHER PUBLICATIONS

Mediatek Inc: "Timing relationship enhancements for NR-NTN", 3GPP Draft; R1-2107064, 3rd Generation Partnership Project (3GPP), Mobile Competence Centre ; 650, Route Des Lucioles ; F-06921 Sophia-Antipolis Cedex ; France ; vol. RAN WG1, No. e-Meeting; Aug. 16, 2021 to Aug. 27, 2021 (Year: 2021).*

(Continued)

*Primary Examiner* — Brian T O Connor
(74) *Attorney, Agent, or Firm* — Skaar Ulbrich Macari, P.A.

(57) ABSTRACT

Methods, systems, and apparatuses are provided for User Equipment (UE) Timing Advance (TA) reporting in a wireless communication system. The UE can appropriately trigger the TA report with the different configurations by system information (e.g., for Random Access (RA) procedure, for TA report during RA, etc.) and dedicated signaling (e.g., for Radio Resource Control (RRC) connected mode, for event-triggered TA report, etc.). A method for a UE in a wireless communication system can comprise receiving a first configuration of TA report, receiving a second configuration of TA report, and determining whether to trigger a second TA report upon receiving the second configuration based on whether a first TA report has been transmitted to a serving cell.

20 Claims, 12 Drawing Sheets

(56) References Cited

U.S. PATENT DOCUMENTS

| | | | | |
|---|---|---|---|---|
| 2022/0095258 A1* | 3/2022 | Yeo | .............. | H04W 80/02 |
| 2022/0232503 A1* | 7/2022 | Cheng | .............. | H04W 56/0045 |
| 2022/0369264 A1* | 11/2022 | Cheng | .............. | H04W 48/08 |
| 2023/0007608 A1* | 1/2023 | Li | .............. | H04W 74/0808 |
| 2023/0099762 A1* | 3/2023 | Khoshkholgh Dashtaki et al. ..... H04W 56/001 370/350 |
| 2023/0116853 A1* | 4/2023 | Ji | .............. | H04W 72/121 370/336 |
| 2023/0117959 A1* | 4/2023 | Tripathi | .............. | H04W 56/0045 370/328 |

OTHER PUBLICATIONS

Extended European Search Report to the corresponding European Patent Application rendered by the European Patent Office (EPO) dated Apr. 4, 2023, 11 pages.

Mediatek Inc: "Timing relationship enhancements for IoT-IoT NTN", 3GPP Draft; R1-2107068, retrieved from the Internet on Aug. 6, 2021; 8 pages.

Mediatek Inc: "Timing relationship enhancements for NR-NTN", 3GPP Draft; R1-2005495, retrieved from the Internet on Aug. 7, 2020; 6 pages.

Nokia et al.: "Further discussion on RACH issues for NR NTN", 3GPP Draft; R2-2108114, retrieved from the Internet on Aug. 6, 2021; 6 pages.

3GPP: "3GPP RAN WG2 Meeting #116e; R2-2111615", Nov. 1, 2021; 49 pages.

Thales: "Solutions for NR to support non-terrestrial networks (NTN)-RP201256", Jun. 29, 2020; 10 pages.

* cited by examiner

US 11,737,042 B2

METHOD AND APPARATUS FOR UE TA REPORTING IN A WIRELESS COMMUNICATION SYSTEM

CROSS-REFERENCE TO RELATED APPLICATIONS

The present application claims priority to and the benefit of U.S. Provisional Patent Application Ser. No. 63/283,250, filed Nov. 25, 2021, which is fully incorporated herein by reference.

FIELD

This disclosure generally relates to wireless communication networks and, more particularly, to a method and apparatus for User Equipment (UE) Timing Advance (TA) reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for User Equipment (UE) Timing Advance (TA) reporting in a wireless communication system. The UE can appropriately trigger the TA report with the different configurations by system information (e.g., for Random Access (RA) procedure, for TA report during RA, etc.) and dedicated signaling (e.g., for Radio Resource Control (RRC) connected mode, for event-triggered TA report, etc.).

In various embodiments, with this and other concepts, systems, and methods of the present invention, a method for a UE in a wireless communication system comprises receiving a first configuration of TA report, receiving a second configuration of TA report, and determining whether to trigger a second TA report upon receiving the second configuration based on whether a first TA report has been transmitted to a serving cell.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-201256, "Solutions for NR to support non-terrestrial networks (NTN)"; [2] 3GPP TR 38.821 V16.0.0, "Solutions for NR to support non-terrestrial networks (NTN)"; [3] R2-2111615, "Stage-3 running CR for TS 38.321 for Rel-17 NTN"; and [4] R2-2111221, "LS on UE TA reporting". The standards and documents listed above are hereby expressly and fully incorporated herein by reference in their entirety.

Figure 1:
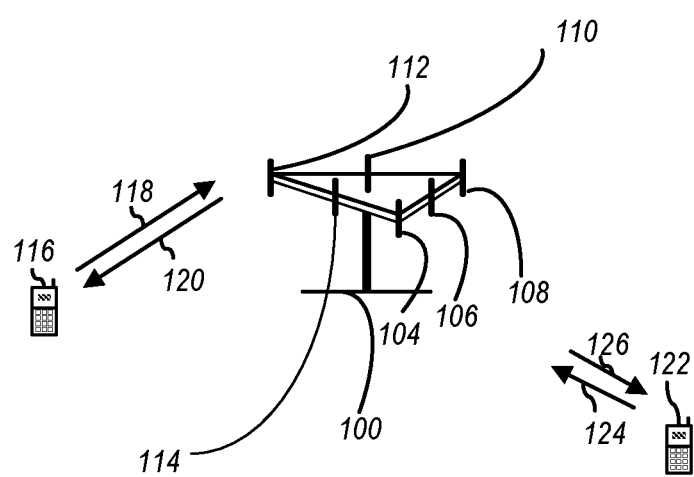
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
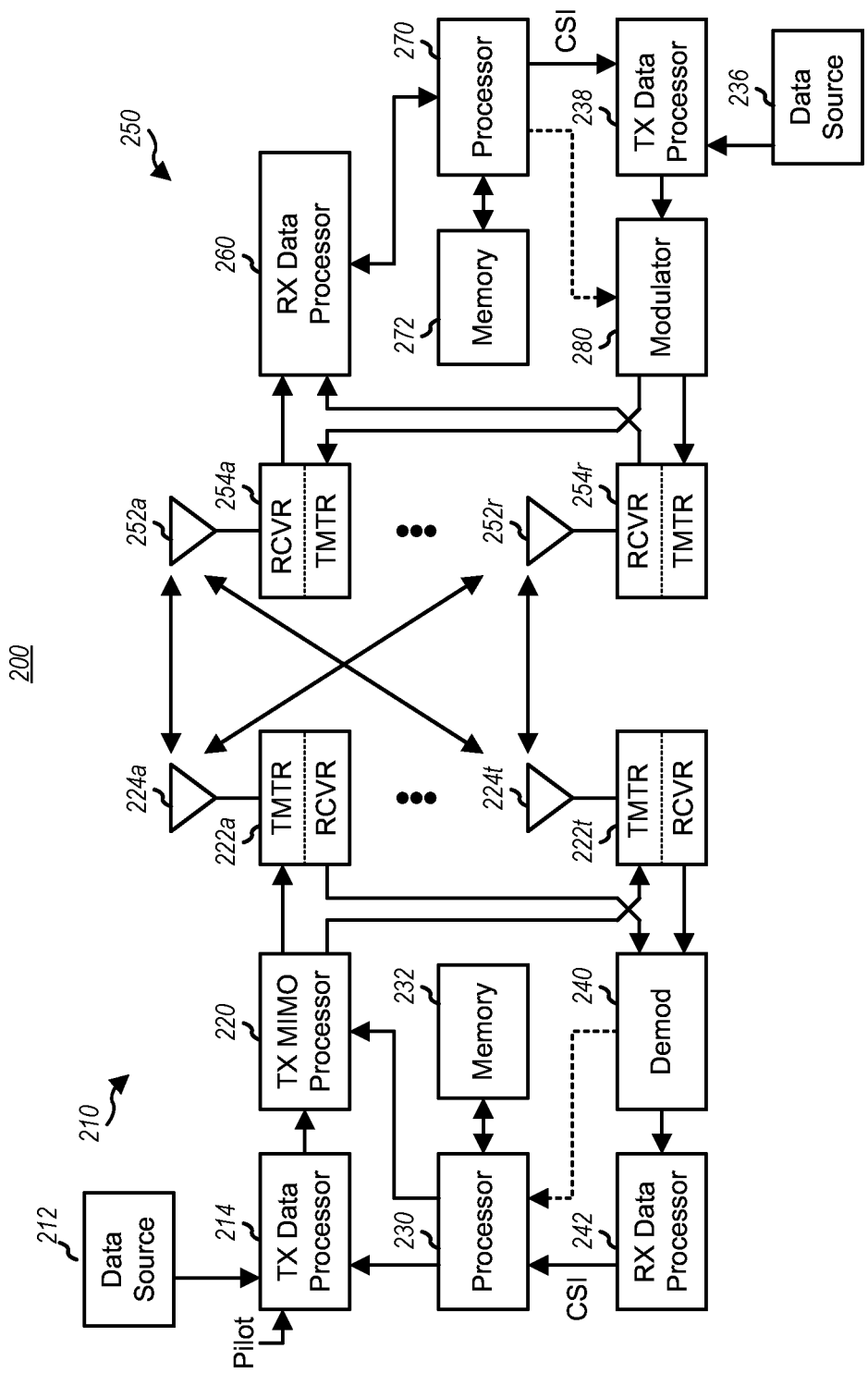
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
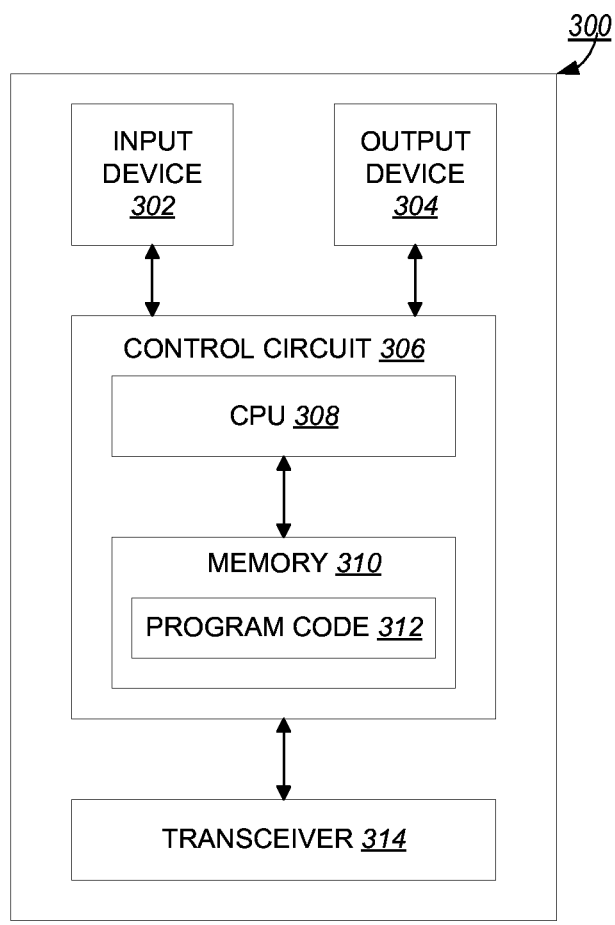
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
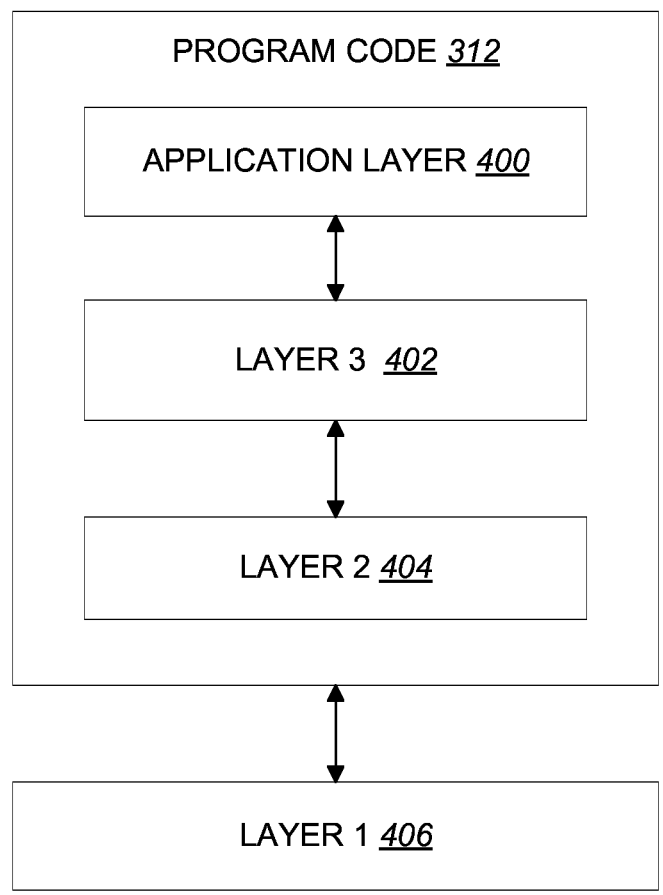
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The description of the work item of non-terrestrial networks (NTN) in NR is specified in [1] RP-201256, "Solutions for NR to support non-terrestrial networks (NTN)":

********************************* Quotation Start [1] *********************************
3 Justification
Non-terrestrial networks refer to networks, or segments of networks, using an airborne or spaceborne vehicle for transmission:
    Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)
    Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.
In 3GPP TS 22.261 approved at SA#82, use cases for 5G Satellite integration and the corresponding service requirements have been identified as result of the work item "5GSAT". This will address mobile broadband needs in unserved/underserved areas as well as public safety needs, maritime (3GPP TS 22.119 "Maritime communication services over 3GPP system"), airplane connectivity and railway communication service requirements applicable to satellite access.
Since RAN#76, two activities on NR to support Non-Terrestrial Networks have been successively carried out
    A first activity, FS_NR_nonterr_nw (see RP-171450) studied the channel model for the non-terrestrial networks, to define deployment scenarios, parameters and identify the key potential impacts on NR. The work led by RAN started at RAN#76 and has been completed at RAN#80. The results are reflected in TR 38.811.
    A second activity, FS_NR_NTN_solutions (see RP-190710), define and evaluate solutions for the identified key impacts from the first activity. The work led by RAN3 started at RAN#80 and is planned to be completed at RAN#86. The results are reflected in TR 38.821 (RP-193062).
Furthermore an email discussion took place between RAN#85 and #86 on the scoping of a REl-17 WI on non-terrestrial network. The report of this email discussion is available in RP-192500. It concluded that the Rel-17 NR-NTN NWI should include two activities:
    Normative activity on NR-NTN to develop specifications to support the following scenarios:
        Transparent payload based LEO scenario addressing at least 3GPP class 3 UE with and without GNSS capability and both Earth fixed &/or moving cell scenario (as per SI outcome).

Note 1: Addressing LEO will provide the flexibility to also support transparent payload based
HAPS based scenarios.
Transparent payload based GEO scenario addressing UE with GNSS capability.
Note 2: Addressing LEO and GEO scenarios will enable NR to support all NGSO scenarios
with circular orbit at altitude greater than or equal to 600 km.
Study activity on NTN scenarios addressing
Transparent payload based HAPS scenarios: Study of enablers for Spectrum coexistence with cellular
(additional Coresets, PCI confusion mitigation, . . . )
IoT-NTN based scenarios
NTN-network based location of UE (for regulatory services): identify possible solutions
Based on the above points, a new work item is proposed to carry the conclusion of the FS_NR_NTN_solutions study item
and specify the solutions enabling NR to support non-terrestrial networks.
Addressing LEO and GEO scenarios will enable to support all NGSO scenarios with circular orbit at altitude greater than
or equal to 600 km.
4 Objective
4.1 Objective of SI or Core part WI or Testing part WI
The work item aims to specify the enhancements identified for NR NTN (non-terrestrial networks) especially LEO and
GEO with implicit compatibility to support HAPS (high altitude platform station) and ATG (air to ground) scenarios
according to the following principles:
FDD is assumed for core specification work for NR-NTN.
NOTE: This does not imply that TDD cannot be used for relevant scenarios e.g. HAPS, ATG
Earth fixed Tracking area is assumed with Earth fixed and moving cells
UEs with GNSS capabilities are assumed.
Transparent payload is assumed
The detailed objectives are to specify enhancing features to Rel-15 & Rel-16's NR radio interface & NG-RAN as follows:
4.1.1 RAN1
Enhancing features to address the identified issues due to long propagation delays, large Doppler effects, and moving
cells in NTN, the following should be specified (see TR 38.821):
Timing relationship enhancements [RAN1, RAN2]
Enhancements on UL time and frequency synchronization [RAN1, RAN2]
************************************** Quotation End **************************************

The UE-specific TA reporting for NR NTN is captured in the
running MAC CR ([3] R2-2111615, "Stage-3 running CR
for TS 38.321 for Rel-17 NTN"):

************************************** Quotation Start [3] **************************************
5.1 Random Access procedure
5.1.1 Random Access procedure initialization
The Random Access procedure described in this clause is initiated by a PDCCH order, by the MAC entity itself, or by
RRC for the events in accordance with TS 38.300 [2]. There is only one Random Access procedure ongoing at any point
in time in a MAC entity. [ . . . ]
RRC configures the following parameters for the Random Access procedure:
    [ . . . ]
    enableTA-Report: indicates whether UE-specific TA reporting during Random Access procedure is enabled. [ . . . ]
5.1.3a MSGA transmission
The MAC entity shall, for each MSGA:
    [ . . . ]
    1> if this is the first MSGA transmission within this Random Access procedure:
        2> if the transmission is not being made for the CCCH logical channel:
            3> indicate to the Multiplexing and assembly entity to include a C-RNTI MAC CE in the subsequent uplink
                transmission.
        2> if the Random Access procedure was initiated for SpCell beam failure recovery and spCell-BFR-CBRA with
            value true is configured:
            3> indicate to the Multiplexing and assembly entity to include a BFR MAC CE or a Truncated BFR MAC CE
                in the subsequent uplink transmission.
        2> if the Random Access procedure was not initiated due to SI Request and enableTA-Report with value enabled
            is configured:
            3> indicate to the Multiplexing and assembly entity to include a UE-Specific TA Report MAC CE in the
                subsequent uplink transmission.
        2> obtain the MAC PDU to transmit from the Multiplexing and assembly entity according to the HARQ
            information determined for the MSGA payload (see clause 5.1.2a) and store it in the MSGA buffer.
    [ . . . ]
5.1.4 Random Access Response reception
Once the Random Access Preamble is transmitted and regardless of the possible occurrence of a measurement gap, the
MAC entity shall:
    [ . . . ]
    1> else if a valid (as specified in TS 38.213 [6]) downlink assignment has been received on the PDCCH for the RA-
        RNTI and the received TB is successfully decoded:
        [ . . . ]
        4> apply the following actions for the Serving Cell where the Random Access Preamble was transmitted:
            5> process the received Timing Advance Command (see clause 5.2);
            5> indicate the preambleReceivedTargetPower and the amount of power ramping applied to the latest
                Random Access Preamble transmission to lower layers (i.e.
                (PREAMBLE_POWER_RAMPING_COUNTER − 1) × PREAMBLE_POWER_RAMPING_STEP);

-continued

```
            5> if the Random Access procedure for an SCell is performed on uplink carrier where pusch-Config is
               not configured:
                  6> ignore the received UL grant.
            5> else:
                  6> process the received UL grant value and indicate it to the lower layers.
         4> if the Random Access Preamble was not selected by the MAC entity among the contention-based
            Random Access Preamble(s):
               5> consider the Random Access procedure successfully completed.
         4> else:
            5> set the TEMPORARY_C-RNTI to the value received in the Random Access Response;
            5> if this is the first successfully received Random Access Response within this Random Access
               procedure:
                  6> if the transmission is not being made for the CCCH logical channel:
                     7> indicate to the Multiplexing and assembly entity to include a C-RNTI MAC CE in the
                        subsequent uplink transmission.
                  6> if the Random Access procedure was initiated for SpCell beam failure recovery and spCell-BFR-
                     CBRA with value true is configured:
                     7> indicate to the Multiplexing and assembly entity to include a BFR MAC CE or a Truncated
                        BFR MAC CE in the subsequent uplink transmission.
                  6> if the Random Access procedure was not initiated due to SI Request and enableTA-Report with
                     value enabled is configured:
                     7> indicate to the Multiplexing and assembly entity to include a UE-Specific TA Report MAC
                        CE in the subsequent uplink transmission.
                  6> obtain the MAC PDU to transmit from the Multiplexing and assembly entity and store it in the
                     Msg3 buffer.
[ . . . ]
5.XX UE-Specific TA reporting
The UE may be configured to report information about UE specific timing advance during a Random Access procedure
not due to SI request and/or when in RRC_CONNECTED.
During Random Access procedure not due to SI request, the UE may be configured to report UE specific TA value using
the UE-Specific TA Report MAC CE. Reporting of the UE-specific TA is controlled by enableTA-Report included in
system information.
    Editor's note: Event-triggers for reporting information about UE specific TA in connected mode is supported and are
        based on TA values. A TA offset threshold can be used for event-triggered reporting, at least the offset
        threshold can be between current information about UE specific TA and the last successfully reported
        information about UE specific TA.
    Editor's note: The above requires RAN1 confirmation and can be revisited pending RAN1 conclusions.
    Editor's note: If the reported content of information about UE specific TA is UE location information in connected
        mode, RRC signalling is used to report.
    Editor's note: Agreement: Under the work assumption "the UE location information cannot be reported in connected
        mode", the content of UE specific TA reported in connected mode is UE specific TA pre-compensation(for
        the details of the TA value, confirmation from RAN1 is needed).
    Editor's note: Agreement: Under the work assumption "the UE location information can be reported in connected
        mode", for TA reporting purposes in connected mode, the network can configure the UE to send either the
        UE specific TA pre-compensation (for the details of the TA value, confirmation from RAN1 is needed) or
        the UE location information
    Editor's note: Agreement: If the reported content of information about UE specific TA is TA pre-compensation value
        in connected mode, MAC CE is used to report
    Editor's note: Agreement: In case UE location information can be reported to network, dedicated signaling is used to
        configure UE to report the UE location and/or the UE specific TA information for the purpose of TA
        reporting in connected mode. FFS if both mechanisms are needed in parallel
[ . . . ]
6.1.3.XX UE-Specific TA Report MAC CE
The UE-Specific TA Report MAC CE is identified by MAC subheader with LCID as specified in Table 6.2.1-2.
It has a fixed size and consists of a single field defined as follows:
    UE-specific TA: This field contains the UE estimate of the UE-specific TA. The length of the field is XX bits
    Editor's note: Details and content of UE-Specific TA Report MAC CE require confirmation from RAN1 and will be
        revisited pending RAN1 conclusions.
*************************************** Quotation End ****************************************
```

In the past RAN2 meetings, the following agreements were made:

At least for uplink scheduling adaptations, the UE may report information about the UE specific TA pre-compensation. The exact information and frequency of reports depend on RAN1 outcome. FFS on when/how to report.

The UE reports the UE specific TA pre-compensation during RACH procedure using MAC CE (FFS if this needs to be configured). Actual content is FFS and also depends on further RAN1 input.

(RAN2 #114-e)

If enabled by the network, the UE reports information about UE specific TA pre-compensation at the random access procedure (MSGA/MSG3 or MSG5) using a MAC CE.

(RAN2 #115-e)

UE specific TA reporting during RACH procedure is enabled/disabled by System Information (SI) (FFS for RACH in connected mode)

The content of UE specific TA pre-compensation reported in RA procedure using MAC CE is UE specific TA (this can be revisited after receiving RAN1 response).

Reporting on the information about UE specific TA in connected mode is supported, FFS via RRC signalling or MAC CE Event-triggers for reporting on the information about UE specific TA in connected mode is supported. FFS on the details. Confirmation by RAN1 is also needed If configured, the UE shall report information of the UE specific TA pre-compensation to the target cell during the random access. FFS if a new indication in RRC reconfiguration with sync is needed or not (besides the System Information Block (SIB) indication carried in HO command on whether TA report is enabled/disabled in the target cell).

Information about UE specific TA pre-compensation is not reported in RA procedures triggered due to "Request for Other SI"

The event-triggers for reporting information about UE specific TA are based on TA values (confirmation from RAN1 is needed)

A TA offset threshold can be used for event-triggered reporting, at least the offset threshold can be between current information about UE specific TA and the last successfully reported information about UE specific TA The event-triggers for reporting information about UE specific TA based on time threshold is not supported in NTN.

No new indication in RRC reconfiguration with sync is needed to configure the UE to report information about UE specific TA in handover procedure (besides the SIB indication carried in HO command on whether TA report is enabled/disabled in the target cell).

If the reported content of information about UE specific TA is UE location information in connected mode, RRC signalling is used to report.

Under the work assumption "the UE location information can be reported in connected mode", for TA reporting purposes in connected mode, the network can configure the UE to send either the UE specific TA pre-compensation (for the details of the TA value, confirmation from RAN1 is needed) or the UE location information (Working Assumption) If the reported content of information about UE specific TA is TA pre-compensation value in connected mode, MAC CE is used to report (RAN2 #116-e)

Do not mandate Msg3/MsgA or Msg5 to include TA report MAC CE, and whether it can be included depends on the TB size of Msg3/MsgA or Msg5. No spec change is needed for this If the reported content of information about UE specific TA is TA pre-compensation value in connected mode, MAC CE is used to report In case UE location information can be reported to network, dedicated signaling is used to configure UE to report the UE location and/or the UE specific TA information for the purpose of TA reporting in connected mode. FFS if both mechanisms are needed in parallel The non-terrestrial networks (NTNs) are to be introduced in New Radio (NR) to use an airborne/spaceborne vehicle as platform for providing mobile services (e.g., [1] RP-201256, "Solutions for NR to support non-terrestrial networks (NTN)". The UE may link to, camp on and/or connect to the NTN network that involves airborne/spaceborne for transmission. NTN may comprise various platforms, including low earth orbit (LEO) satellite, medium earth orbit (MEO) satellite, highly elliptical orbit (HEO) satellite, geostationary earth orbit (GEO) satellite, geostationary synchronous Orbit (GSO) satellite, non-geostationary synchronous orbit (NGSO) satellite and/or high altitude platform station (HAPS). A LEO satellite could have earth-fixed beam (e.g., the beam is temporarily fixed on a location during a time period) or earth-moving beam (e.g., the beam is continuously moving along with the satellite). The NTN could offer a wide-area coverage and provide NW access in the scenario when terrestrial networks (TNs) are unfeasible (e.g., desert, polar area, and/or on an airplane). More details regarding different NTN platforms could be found in TR 38.821 ([2] 3GPP TR 38.821 V16.0.0).

To achieve UL synchronization in NTN, the UE would pre-compensate Timing Advance (TA) by considering UE position, common TA and satellite ephemeris. Information about UE TA could be reported by the UE to a Network (NW) in NTN. The information about UE TA could be reported in initial access and/or in Radio Resource Control (RRC) connected mode. The UE would report TA during a Random Access (RA) procedure if enabled by system information, e.g., for initial access, for first event. The UE would report TA based on a triggering event configured by dedicated signaling.

If enabled by NW, the information about UE TA could be reported during/at RA procedure (e.g., in MSGA/Msg3 or Msg5) using Medium Access Control (MAC) Control Element (CE). The TA reporting during/at RA procedure would be enabled/disabled by system information. The TA reporting during/at RA procedure may be controlled by a parameter (e.g., enableTA-Report) included in a system information. And the TA reporting in RRC connected mode is event-triggered (e.g., configured by NW). The reporting event would be based on a TA offset (threshold) between current information about UE TA and the last successfully reported information about UE TA. For example, if the TA value of the UE changes above the TA offset threshold (e.g., the difference between current TA and the last successfully reported TA is above an offset) in RRC connected mode, the UE would trigger the TA reporting. A dedicated signaling (e.g., RRC configuration) is used to configure the UE to report UE location information and/or TA related information for the purpose of TA reporting in RRC connected mode.

For example, the UE may report the information related to UE specific TA during/at RA procedure (e.g., in initial access) using a MAC CE, if the reporting is enabled by system information (e.g., enableTA-Report in a system information is set to enabled, enableTA-Report is present in a system information). The UE may not report the information related to UE specific TA during/at RA procedure (e.g., in initial access), if the reporting is disabled (or is not enabled) by system information (e.g., enableTA-Report in a system information is not set to enabled, enableTA-Report is absent in a system information).

The UE may report the information related to UE specific TA in RRC connected mode if configured by dedicated signaling and (at least) a reporting event is fulfilled/triggered. The UE may be configured to report the information related to UE specific TA with content as TA related information and/or UE location information in RRC connected mode. The UE may be configured to report the information related to UE specific TA with content as TA related information using MAC CE in RRC connected mode. The UE may be configured to report the information related to UE specific TA with content as UE location information using RRC signaling in RRC connected mode. The TA reporting in RRC connected mode may be enabled/disabled by system information. The TA reporting in RRC connected mode may not be enabled/disabled by system information. The UE may report the information related to UE specific TA during/at RA procedure (e.g., for RRC reconfiguration with sync and/or handover (HO)) in RRC connected mode using MAC CE, if the reporting is enabled by system information (e.g., included in handover command message). The UE may not report the information related to UE specific TA during RA procedure (e.g., for RRC reconfiguration with sync and/or handover) in RRC connected mode, if the reporting is disabled by system information (e.g., included in HO command message).

Based on the current agreements, the TA report during/at RA procedure and the TA report in RRC connected mode would be separately configured. The TA report during/at RA procedure would be configured by system information, and the TA report in RRC connected mode would be configured by dedicated signaling (e.g., RRC message). Moreover, the TA report during/at RA procedure would be reported once configured/enabled, and TA report in RRC connected mode would need to be triggered by a reporting event once configured. The reporting event to trigger a TA report in RRC connected mode (e.g., an event-triggered TA report) would be based on TA offset between the current TA and the TA included in the last TA report. For example, TA report is triggered if the TA offset is larger than a configured threshold.

However, it is possible that when a UE is configured with the TA report in RRC connected mode, there is no prior TA report. For example, the UE is in a cell where TA report during/at RA procedure is not enabled (e.g., indicated by system information) and the UE receives a dedicated signaling to configure TA report in RRC connected mode. In this case, TA report cannot be triggered because the UE is unable to compute the TA offset between the current TA and the TA included in the last TA report. To solve the issue, a TA report should be triggered by the UE in response to configuration of TA report in RRC connected mode. The UE could be configured with event-triggered TA report. The reporting event and/or event-triggered TA report is triggered when TA offset between current TA and the last reported TA is above a threshold. To prevent from no prior TA report to compare, a TA report could be triggered upon configuration of the event-triggered TA report.

On the other hand, it is also possible that when a UE is configured with the TA report in RRC connected mode, a TA report has been reported by the UE. It is possible that the NW also configures TA report during RA. For example, the UE is in a cell where TA report during/at RA procedure is enabled (e.g., indicated by system information) and the UE receives a dedicated signaling to configure TA report in RRC connected mode. In this case, always triggering a TA report in response to (or upon) configuration of TA report in RRC connected mode (e.g., event-triggered TA report) may not be good in view of signaling overhead.

Considering there may be different configurations for a UE to trigger a TA report and there may be different contents and/or triggers for the TA report, method(s) for a UE to determine whether and how to trigger and/or include information in a TA report should be considered.

To solve the issue, the UE could determine whether to trigger a TA report in response to (or upon) receiving a configuration to configure TA report (e.g., with content of first information and/or second information) in RRC connected mode, based on at least one or more conditions being fulfilled. The first information may be a TA related information. The second information may be a UE location information.

The condition may be (or include) one or more of the following:
- if (or whether) the TA report at/during RA procedure is enabled;
- if (or whether) the content of last reported TA is second information (e.g., UE location information) or first information (e.g., TA related information);
- if (or whether) the configuration to configure TA report in RRC connected mode is received in a HO command (e.g., a RRCReconfiguration comprising reconfigurationWithSync);
- if (or whether) there is prior TA report (e.g., in the same cell);
- if (or whether) there is prior TA report (e.g., in the same cell) with content as TA related information;
- if (or whether) there is prior TA report (e.g., in the same cell) with content as UE location information;
- if (or whether) there is prior TA report (e.g., in the same cell) with content as the same information as the configured TA report in RRC connected mode;
- if (or whether) the configured TA report content in the configuration to configure TA report in RRC connected mode is the same as the content of the prior TA report (e.g., in the same cell); and/or
- if (or whether) there is prior TA report in (current) RRC connected mode.

The UE could determine whether to trigger a TA report in response to (or upon) receiving a configuration to configure TA report (e.g., in RRC connected mode, configuration of event-triggered TA report), based on whether there is prior TA report in the same/current serving cell, e.g., in (current) RRC connected mode. For example, the UE could determine whether to trigger a second TA report in response to (or upon) receiving a configuration to configure TA report (e.g., in RRC connected mode, configuration of event-triggered TA report), based on whether a first TA report is (or has been) triggered, generated, transmitted and/or reported in the same/current serving cell, e.g., in (current) RRC connected mode. The UE could determine to trigger a TA report in response to receiving a configuration for event-triggered TA report based on whether the first TA report is (or has been) triggered, generated, transmitted and/or reported, e.g., to the serving cell. In one example, if a first TA report has been triggered during RA (e.g., for initial access, for first event), the UE does not trigger a second TA report upon receiving a configuration of event-triggered TA report. If a first TA report has not been triggered during RA (e.g., for initial access, for first event), the UE triggers a second TA report upon receiving a configuration of event-triggered TA report. The first TA report and second TA report may be transmitted to the same cell (e.g., (current) serving cell).

In some examples, the UE could determine whether to trigger a TA report in response to (or upon) receiving a configuration to configure TA report in RRC connected mode, based on whether TA report at/during RA procedure is enabled or not.

Case 1: TA Report at/During RA Procedure is Disabled, and TA Report (with a First Information and/or Second Information) in RRC Connected Mode is Configured.

Figure 5:
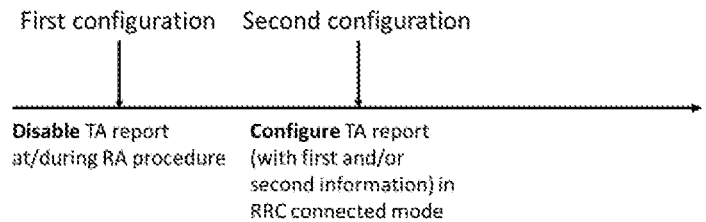
FIG. 5 is an example case/scenario diagram, wherein TA report at/during RA procedure is disabled, and TA report (with a first information and/or second information) in RRC connected mode is configured, in accordance with embodiments of the present invention.

The UE could (determine to) trigger a TA report in response to (or upon) receiving a configuration to configure TA report in RRC connected mode, if the TA report at/during RA procedure is not enabled (or is disabled). For example, as shown in FIG. 5, the UE receives a first configuration (e.g., in a system information) indicating that the TA report at/during RA procedure is not enabled (or is disabled). The UE receives a second configuration (e.g., in a dedicated signaling) indicating/configuring the TA report with a first information and/or second information in RRC connected mode. In response to (or upon) receiving the second configuration (e.g., in the dedicated signaling) (e.g., with the configuration of TA report in RRC connected mode), the UE triggers a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled (or triggered) when the change (or difference, or offset) of UE TA between the current information about UE TA and the last reported information about UE TA is larger than (or not smaller than) a configured threshold. The UE may trigger a TA report when the change (or difference, or offset) of UE TA between the current information about UE TA and the last reported information about UE TA is larger than (or not smaller than) a configured threshold.

Case 2: TA Report at/During RA Procedure is Enabled, and TA Report (with a First Information or Second Information) in RRC Connected Mode is Configured.

Figure 6:
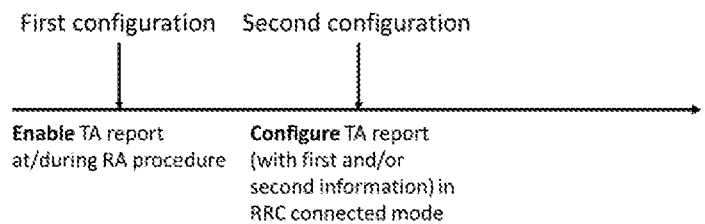
FIG. 6 is an example case/scenario diagram, wherein TA report at/during RA procedure is enabled, and TA report (with a first information or second information) in RRC connected mode is configured, in accordance with embodiments of the present invention.

The UE could determine not to trigger a TA report in response to (or upon) receiving a configuration to configure TA report in RRC connected mode, if the TA report at/during RA procedure is enabled (or is not disabled). For example, as shown in FIG. 6, the UE receives a first configuration (e.g., in a system information) indicating that the TA report at/during RA procedure is enabled. The UE receives a second configuration (e.g., in a dedicated signaling) indicating/configuring the TA report with a first information and/or second information in RRC connected mode. In response to (or upon) receiving the second configuration (e.g., in the dedicated signaling) (e.g., with the configuration of TA report in RRC connected mode), the UE does not trigger a TA report. Additionally and/or alternately, the UE may trigger a TA report when/upon a reporting event is fulfilled/triggered in RRC connected mode. The reporting event may be fulfilled (or triggered) when the change (or difference, or offset) of UE TA between the current information about UE TA and the last reported information about UE TA is larger than (or not smaller than) a configured threshold. The UE may trigger a TA report when the change (or difference, or offset) of UE TA between the current information about UE TA and the last reported information about UE TA is larger than (or not smaller than) a configured threshold.

The UE could determine whether to trigger a TA report in response to (or upon) receiving a configuration to configure TA report in RRC connected mode, if the TA report at/during RA procedure is enabled (or is not disabled), based on whether a reporting event is fulfilled. For example, the UE receives a first configuration (e.g., in a system information) indicating that the TA report at/during RA procedure is enabled. The UE receives a second configuration (e.g., in a dedicated signaling) indicating/configuring the TA report with a first information and/or second information in RRC connected mode. In response to (or upon) receiving the second configuration (e.g., in the dedicated signaling) (e.g., with the configuration of TA report in RRC connected mode), the UE may trigger a TA report if a reporting event is fulfilled in RRC connected mode. The UE may not trigger a TA report if the reporting event is not fulfilled in RRC connected mode. The reporting event may be fulfilled (or triggered) when the change (or difference, or offset) of UE TA between the current information about UE TA and the last reported information about UE TA is larger than (or not smaller than) a configured threshold. The UE may trigger a TA report when the change (or difference, or offset) of UE TA between the current information about UE TA and the last reported information about UE TA is larger than (or not smaller than) a configured threshold.

The UE may receive a first configuration of TA report. The UE may determine (whether) to trigger a first TA report based on the first configuration. The UE may receive a second configuration of TA report. The UE may determine (whether) to trigger a second TA report in response to (or upon) receiving the second configuration based on the first configuration and/or the first TA report.

In one example, the UE may receive a first configuration (e.g., in a system information) indicating that the TA report at/during RA procedure is enabled. The UE may receive a system information including the first configuration configured as enabled. The UE may trigger a first TA report during or due to a RA procedure for initial access and/or for a first event. The UE may transmit the first TA report during the RA procedure or after the RA procedure (e.g., in subsequent transmission of the RA procedure). The UE may transmit the first TA report using the Uplink (UL) grant of Msg3/MSGA. The UE may transmit the first TA report using the UL grant received after transmitted a Msg3/MSGA. The UE may receive a second configuration (e.g., in a dedicated signaling) indicating/configuring/enabling the TA report in RRC connected mode (e.g., the event-triggered TA report). In response to (or upon) receiving the second configuration (e.g., in the dedicated signaling), the UE may not trigger a second TA report based on the first TA report has been transmitted (and/or triggered). The UE may trigger a third TA report when the change (or difference, or offset) of UE TA between the current information about UE TA and the last reported information about UE TA (e.g., the TA reported in the first TA report) is larger than (or not smaller than) a configured threshold, e.g., based on the second configuration. The UE may transmit the third TA report using available UL grant.

Additionally and/or alternately, the UE may receive a first configuration (e.g., in a system information) indicating that the TA report at/during RA procedure is not enabled. The UE may not receive the first configuration (e.g., in a system information) indicating that the TA report at/during RA procedure is enabled. The first configuration may be omitted or not present in the system information. The UE may receive a system information not including the first configuration. The UE may not trigger a first TA report during or due to a RA procedure for initial access and/or for a first event. The UE may not transmit the first TA report during the RA procedure or after the RA procedure (e.g., in subsequent transmission of the RA procedure). The UE may receive a second configuration (e.g., in a dedicated signaling) indicating/configuring/enabling the TA report in RRC connected mode (e.g., the event-triggered TA report). In response to (or upon) receiving the second configuration (e.g., in the dedicated signaling), the UE may trigger a second TA report based on the first TA report has not been transmitted (and/or triggered). The UE may transmit the second TA report using available UL grant. The UE may trigger a third TA report when the change (or difference, or offset) of UE TA between the current information about UE TA and the last reported information about UE TA (e.g., the TA reported in the first TA report) is larger than (or not smaller than) a configured threshold, e.g., based on the second configuration. The UE may transmit the third TA report using available UL grant.

In some examples, the UE could determine whether to trigger a TA report in response to (or upon) receiving a configuration to configure TA report in RRC connected mode, based on whether TA report at/during RA procedure is enabled or not and whether the content of last reported TA (e.g., the last reported information about UE TA) (e.g., in a serving cell of the UE, in Primary serving Cell (PCell) of the UE) is UE location information or TA related information.

Case 3: TA Report at/During RA Procedure is Disabled, TA Report in RRC Connected Mode is not Configured (or Dis-Configured), then TA Report (with a First Information and/or Second Information) in RRC Connected Mode is Configured/Reconfigured.

Figure 7:
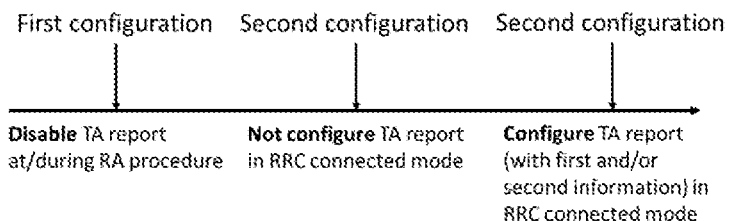
FIG. 7 is an example case/scenario diagram, wherein TA report at/during RA procedure is disabled, TA report in RRC connected mode is not configured (or dis-configured), then TA report (with a first information and/or second information) in RRC connected mode is configured/reconfigured, in accordance with embodiments of the present invention.

The UE could (determine to) trigger a TA report in response to (or upon) receiving a configuration to configure TA report in RRC connected mode, if there is no prior TA report (e.g., in the same cell). For example, as shown in FIG. 7, the UE receives a first configuration (e.g., in a system information) indicating that the TA report at/during RA procedure is not enabled (or is disabled). The UE receives a second configuration (e.g., in a first dedicated signaling) indicating/configuring the TA report is not configured in RRC connected mode. Then the UE receives another second configuration (e.g., a third configuration) (e.g., in a second dedicated signaling) indicating/configuring the TA report with a first information and/or second information in RRC connected mode. In response to (or upon) receiving the (latter) second configuration (e.g., the third configuration) (e.g., in the second dedicated signaling) configuring the TA report in RRC connected mode, the UE triggers a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA and the last reported information about UE TA is larger/not smaller than a configured threshold. The UE may trigger a TA report when the change/difference/offset of UE TA between the current information about UE TA and the last reported information about UE TA is larger/not smaller than a configured threshold.

Case 4-1: TA Report at/During RA Procedure is Disabled, TA Report (with a Second Information) in RRC Connected Mode is Configured, then TA Report (with a First Information) in RRC Connected Mode is Configured/Reconfigured.

Figure 8:
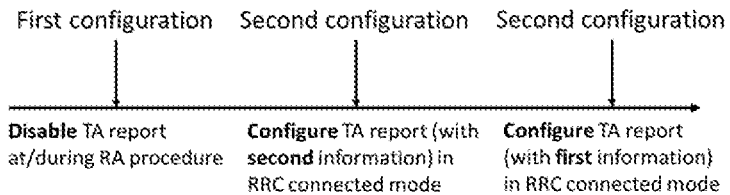
FIG. 8 is an example case/scenario diagram, wherein TA report at/during RA procedure is disabled, TA report (with a second information) in RRC connected mode is configured, then TA report (with a first information) in RRC connected mode is configured/reconfigured, in accordance with embodiments of the present invention.

The UE could (determine to) trigger a TA report in response to (or upon) receiving a configuration to configure TA report in RRC connected mode, if there is no prior TA report with the same content of information (e.g., in the same cell) as indicated/configured by the configuration. For example, as shown in FIG. 8, the UE receives a first configuration (e.g., in a system information) indicating that the TA report at/during RA procedure is not enabled (or is disabled). The UE receives a second configuration (e.g., in a first dedicated signaling) indicating/configuring the TA report with second information in RRC connected mode. Then the UE receives another second configuration (e.g., a third configuration) (e.g., in a second dedicated signaling) indicating/configuring the TA report with first information in RRC connected mode. In response to (or upon) receiving the (latter) second configuration (e.g., the third configuration) (e.g., in the second dedicated signaling) configuring the TA report with first information in RRC connected mode, the UE may trigger a TA report. In response to (or upon) receiving the (latter) second configuration (e.g., the third configuration) (e.g., in the second dedicated signaling) configuring the TA report with first information in RRC connected mode, the UE may not trigger a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA (e.g., a first information) and the last reported information about UE TA (e.g., a first and/or second information) is larger/not smaller than a configured threshold. The UE may trigger a TA report when the change/difference/offset of UE TA between the current information about UE TA (e.g., a first information) and the last reported information (e.g., a first and/or second information) about UE TA is larger/not smaller than a configured threshold.

Case 4-2: TA Report at/During RA Procedure is Disabled, TA Report (with a First Information) in RRC Connected Mode is Configured, then TA Report (with a Second Information) in RRC Connected Mode is Configured/Reconfigured.

Figure 9:
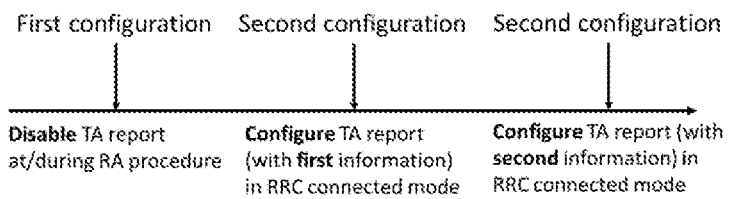
FIG. 9 is an example case/scenario diagram, wherein TA report at/during RA procedure is disabled, TA report (with a first information) in RRC connected mode is configured, then TA report (with a second information) in RRC connected mode is configured/reconfigured, in accordance with embodiments of the present invention.

The UE could (determine to) trigger a TA report in response to (or upon) receiving a configuration to configure TA report in RRC connected mode, if there is no prior TA report with the same content of information (e.g., in the same cell) as indicated/configured by the configuration. For example, as shown in FIG. 9, the UE receives a first configuration (e.g., in a system information) indicating that the TA report at/during RA procedure is not enabled (or is disabled). The UE receives a second configuration (e.g., in a first dedicated signaling) indicating/configuring the TA report with first information in RRC connected mode. Then the UE receives another second configuration (e.g., a third configuration) (e.g., in a second dedicated signaling) indicating/configuring the TA report with second information in RRC connected mode. In response to (or upon) receiving the (latter) second configuration (e.g., the third configuration) (e.g., in the second dedicated signaling) configuring the TA report with second information in RRC connected mode, the UE may trigger a TA report. In response to (or upon) receiving the (latter) second configuration (e.g., the third configuration) (e.g., in the second dedicated signaling) configuring the TA report with second information in RRC connected mode, the UE may not trigger a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA (e.g., a second information) and the last reported information about UE TA (e.g., a first and/or second information) is larger/not smaller than a configured threshold. The UE may trigger a TA report when the change/difference/offset of UE TA between the current information about UE TA (e.g., a second information) and the last reported information (e.g., a first and/or second information) about UE TA is larger/not smaller than a configured threshold.

Case 5: TA Report at/During RA Procedure is Enabled, TA Report in RRC Connected Mode is not Configured (or Dis-Configured), then TA Report (with a First Information and/or Second Information) in RRC Connected Mode is Configured/Reconfigured.

Figure 10:
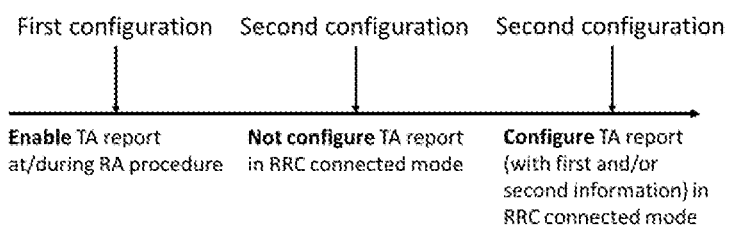
FIG. 10 is an example case/scenario diagram, wherein TA report at/during RA procedure is enabled, TA report in RRC connected mode is not configured (or dis-configured), then TA report (with a first information and/or second information) in RRC connected mode is configured/reconfigured, in accordance with embodiments of the present invention.

The UE could (determine to) trigger a TA report in response to (or upon) receiving a configuration to configure TA report in RRC connected mode, if there is no prior TA report with the same content of information (e.g., in the same cell) as indicated/configured by the configuration and/or if there is no prior TA report in (current) RRC connected mode. For example, as shown in FIG. 10, the UE receives a first configuration (e.g., in a system information) indicating that the TA report at/during RA procedure is enabled. The UE receives a second configuration (e.g., in a first dedicated signaling) indicating/configuring the TA report is not configured in RRC connected mode. Then the UE receives another second configuration (e.g., a third configuration) (e.g., in a second dedicated signaling) indicating/configuring the TA report with a first information and/or second information in RRC connected mode. In response to (or upon) receiving the (latter) second configuration (e.g., the third configuration) (e.g., in the second dedicated signaling) configuring the TA report in RRC connected mode, the UE may trigger a TA report. In response to (or upon) receiving the (latter) second configuration (e.g., the third configuration) (e.g., in the second dedicated signaling) configuring the TA report in RRC connected mode, the UE may not trigger a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA and the last reported information about UE TA is larger/not smaller than a configured threshold. The UE may trigger a TA report when the change/difference/offset of UE TA between the current information about UE TA and the last reported information about UE TA is larger/not smaller than a configured threshold. The last reported information about UE TA may be the first information and/or second information reported in RRC connected mode. The last reported information about UE TA may be the information reported in the TA report at/during RA procedure.

Case 6-1: TA Report at/During RA Procedure is Enabled, TA Report (with a Second Information) in RRC Connected Mode is Configured, then TA Report (with a First Information) in RRC Connected Mode is Configured/Reconfigured.

Figure 11:
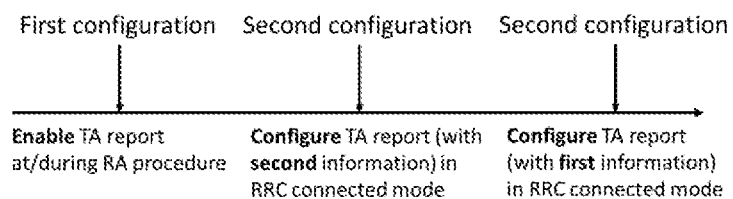
FIG. 11 is an example case/scenario diagram, wherein TA report at/during RA procedure is enabled, TA report (with a second information) in RRC connected mode is configured, then TA report (with a first information) in RRC connected mode is configured/reconfigured, in accordance with embodiments of the present invention.

The UE could (determine to) trigger a TA report in response to (or upon) receiving a configuration to configure TA report in RRC connected mode, if there is no prior TA report with the same content of information (e.g., in the same cell) as indicated/configured by the configuration. For example, as shown in FIG. 11, the UE receives a first configuration (e.g., in a system information) indicating that the TA report at/during RA procedure is enabled. The UE receives a second configuration (e.g., in a first dedicated signaling) indicating/configuring the TA report with second information in RRC connected mode. Then the UE receives another second configuration (e.g., a third configuration) (e.g., in a second dedicated signaling) indicating/configuring the TA report with first information in RRC connected mode. In response to (or upon) receiving the (latter) second configuration (e.g., the third configuration) (e.g., in the second dedicated signaling) configuring the TA report with first information in RRC connected mode, the UE may trigger a TA report. In response to (or upon) receiving the (latter) second configuration (e.g., the third configuration) (e.g., in the second dedicated signaling) configuring the TA report with first information in RRC connected mode, the UE may not trigger a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA (e.g., a first information) and the last reported information about UE TA (e.g., a first and/or second information) is larger/not smaller than a configured threshold. The UE may trigger a TA report when the change/difference/offset of UE TA between the current information about UE TA (e.g., a first information) and the last reported information (e.g., a first and/or second information) about UE TA is larger/not smaller than a configured threshold. The last reported information about UE TA may be the information reported in RRC connected mode. The last reported information about UE TA may be the information reported in the TA report at/during RA procedure.

Case 6-2: TA Report at/During RA Procedure is Enabled, TA Report (with a First Information) in RRC Connected Mode is Configured, then TA Report (with a Second Information) in RRC Connected Mode is Configured/Reconfigured.

Figure 12:
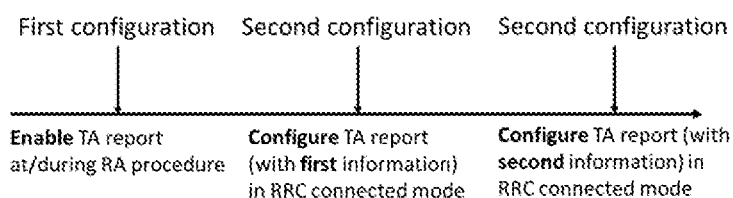
FIG. 12 is an example case/scenario diagram, wherein TA report at/during RA procedure is enabled, TA report (with a first information) in RRC connected mode is configured, then TA report (with a second information) in RRC connected mode is configured/reconfigured, in accordance with embodiments of the present invention.

The UE could (determine to) trigger a TA report in response to (or upon) receiving a configuration to configure TA report in RRC connected mode, if there is no prior TA report with the same content of information (e.g., in the same cell) as indicated/configured by the configuration. For example, as shown in FIG. 12, the UE receives a first configuration (e.g., in a system information) indicating that the TA report at/during RA procedure is not enabled (or is disabled). The UE receives a second configuration (e.g., in a first dedicated signaling) indicating/configuring the TA report with first information in RRC connected mode. Then the UE receives another second configuration (e.g., a third configuration) (e.g., in a second dedicated signaling) indicating/configuring the TA report with second information in RRC connected mode. In response to (or upon) receiving the (latter) second configuration (e.g., the third configuration) (e.g., in the second dedicated signaling) configuring the TA report with second information in RRC connected mode, the UE may trigger a TA report. In response to (or upon) receiving the (latter) second configuration (e.g., the third configuration) (e.g., in the second dedicated signaling) configuring the TA report with second information in RRC connected mode, the UE may not trigger a TA report. The UE may trigger a TA report when/upon a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA (e.g., a second information) and the last reported information about UE TA (e.g., a first and/or second information) is larger/not smaller than a configured threshold. The UE may trigger a TA report when the change/difference/offset of UE TA between the current information about UE TA (e.g., a second information) and the last reported information (e.g., a first and/or second information) about UE TA is larger/not smaller than a configured threshold.

In some examples, the UE could determine whether to trigger a TA report in response to (or upon) receiving a configuration to configure TA report in RRC connected mode, based on whether the configuration is received in a HO command. The HO command is a RRC message indicating reconfiguration with sync and/or handover (e.g., RRCReconfiguration comprising reconfigurationWithSync). A first configuration (e.g., for the TA report at/during RA procedure) and a second configuration (e.g., for TA report in RRC connected mode) are included in the HO command. The HO command comprises the first configuration and second configuration. The UE could trigger a TA report in response to (or upon) receiving the first configuration and/or second configuration in a HO command. The UE could trigger a TA report in response to (or upon) receiving the HO command, if either the first configuration or the second configuration enables the TA report. The UE could trigger a TA report in response to (or upon) receiving the HO command if the first configuration enables TA report at/during RA procedure and/or if the second configuration indicates/configures/enables TA report in RRC connected mode.

Case 7: In a HO Command, TA Report at/During RA Procedure is Disabled and TA Report (with a First Information and/or Second Information) in RRC Connected Mode is Configured.

Figure 13:
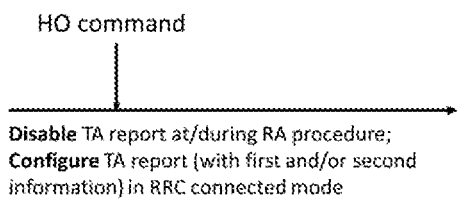
FIG. 13 is an example case/scenario diagram, wherein in a HO command, TA report at/during RA procedure is disabled and TA report (with a first information and/or second information) in RRC connected mode is configured, in accordance with embodiments of the present invention.

The UE could (determine to) trigger a TA report in response to (or upon) receiving a HO command (e.g., RRCReconfiguration with reconfigurationWithSync) with a configuration to configure TA report in RRC connected mode (e.g., even if TA report at/during RA procedure is disabled). For example, as shown in FIG. 13, the UE receives a HO command comprising a first configuration (e.g., in a system information) and a second configuration (e.g., in a dedicated signaling). The first configuration may indicate that the TA report at/during RA procedure is not enabled (or is disabled). The second configuration may indicate/configure the TA report with a first information and/or second information in RRC connected mode. In response to (or upon) receiving the HO command (e.g., with the configuration of TA report in RRC connected mode), the UE triggers a TA report. The UE may initiate a RA procedure for HO in response to receiving the HO command and transmit the TA report during/at the RA procedure. The UE may trigger the TA report regardless of current TA value (e.g., without considering whether the reporting event is fulfilled). The UE may trigger a TA report when/upon a reporting event is fulfilled/triggered in RRC connected mode (e.g., after the RA procedure for HO). The reporting event may be fulfilled/triggered when the change/difference/offset of UE TA between the current information about UE TA and the last reported information about UE TA is larger/not smaller than a configured threshold. The UE may trigger a TA report when the change/difference/offset of UE TA between the current information about UE TA and the last reported information about UE TA is larger/not smaller than a configured threshold.

Case 8: In a HO Command, TA Report at/During RA Procedure is Disabled, and TA Report in RRC Connected Mode is not Configured (or Dis-Configured).

Figure 14:
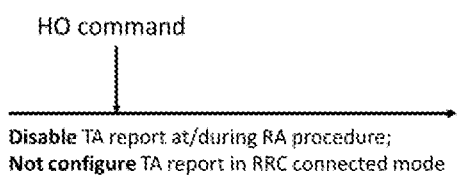
FIG. 14 is an example case/scenario diagram, wherein in a HO command, TA report at/during RA procedure is disabled, and TA report in RRC connected mode is not configured (or dis-configured), in accordance with embodiments of the present invention.

The UE could determine not to trigger a TA report in response to (or upon) receiving a HO command (e.g., RRCReconfiguration with reconfigurationWithSync) without a configuration to configure TA report in RRC connected mode or with a configuration to de-configure (or disable) TA report in RRC connected mode. For example, as shown in FIG. 14, the UE receives a HO command comprising a first configuration (e.g., in a system information) and a second configuration (e.g., in a dedicated signaling). The first configuration may indicate that the TA report at/during RA procedure is not enabled (or is disabled). The second configuration may de-configure (or disable) the TA report with a first information and/or second information in RRC connected mode. In response to (or upon) receiving the HO command, the UE does not trigger a TA report. The UE may initiate a RA procedure for HO in response to receiving the HO command and not transmit a TA report during/at the RA procedure.

In some examples, the UE could determine whether to trigger a TA report in response to (or upon) receiving a configuration to configure TA report (e.g., with content of first information and/or second information) in RRC connected mode based on at least whether the UE has transmitted and/or triggered a TA report (e.g., in a serving cell of the UE, in PCell of the UE, after the last RRC connection procedure, and/or after the last handover). The RRC connection procedure may be triggered by initial access, RRC Connection Resume, RRC Connection Re-establishment and/or synchronous reconfiguration (e.g., handover).

For example, in response to (or upon) configuration of a (event-triggered) TA report (in RRC connected mode), a TA report is triggered (or generated) if the UE has not transmitted (or generated, or triggered) a TA report before (e.g., in the same RRC connection, in the same cell). In response to (or upon) configuration of a (event-triggered) TA report (in RRC connected mode), a TA report is not triggered (or generated) if the UE has transmitted (or generated, or triggered) a TA report before (e.g., in the same RRC connection, in the same cell).

For example, in response to (or upon) configuration of a (event-triggered) TA report (in RRC connected mode), whether a TA report is triggered (or generated) depends on whether the reporting event is fulfilled if the UE has transmitted (or generated) a TA report before (e.g., in the same RRC connection, in the same cell).

One or more examples/scenarios/cases disclosed herein, in whole or in part, could be combined to form another example.

The UE may receive a configuration (e.g., the first configuration) to indicate whether TA report at/during RA procedure is enabled (or disabled), e.g., via system information. The UE may be configured with TA report at/during RA procedure if the configuration (e.g., the first configuration) indicates TA report at/during RA procedure is enabled. If the UE is configured with TA report at/during RA procedure (or the UE receives a configuration, e.g., the first configuration, to enable TA report at/during RA procedure), the UE generates, triggers and/or transmits a TA report at (or during) the RA procedure (and/or the subsequent transmission after the RA procedure, a procedure to trigger the RA procedure, a procedure of the first event related to the RA procedure). The TA report may be included in Msg3, Msg5, or MSGA of the RA procedure. If the UE is not configured with TA report at/during RA procedure (or the UE receives a configuration to disable TA report at RA procedure), the UE does not trigger, generate and/or does not transmit a TA report at (or during) the RA procedure. There may be no TA report included in Msg3, Msg5, or MSGA of the RA procedure (and/or the subsequent transmission after the RA procedure).

The UE may receive a configuration (e.g., the second configuration) of TA report in RRC connected mode, e.g., via a dedicated signaling. The configuration (e.g., the second configuration) may indicate whether event-triggered TA report in RRC connected mode is enabled. The configuration (e.g., the second configuration) may indicate whether the UE should report TA related information or UE location information. The configuration may indicate the reporting event(s) for TA report in RRC connected mode. If the UE is configured with event-triggered TA report in RRC connected mode (or the UE receives a configuration, e.g., the second configuration, to enable event-triggered TA report in RRC connected mode), the UE evaluates whether the TA offset between the current TA and the TA included in the last TA report is larger than (or no smaller than) a configured TA offset threshold. The TA offset threshold is configured, indicated and/or enabled by the second configuration. The UE may trigger (or generate) a TA report if a reporting event is fulfilled. The UE may trigger (or generate) a TA report if the TA offset is larger than (or no smaller than) a configured TA offset threshold. The UE may not trigger (or generate) a TA report if the TA offset is no larger than (or smaller than) the configured TA offset threshold. The UE may have transmitted a TA report before (e.g., in the same cell, after completion of the last RRC connection procedure, and/or after the last handover). The last TA report may be reported at (or during) a RA procedure (e.g., in Msg3, Msg5, or MSGA). The last TA report may be reported in RRC connected mode. The last TA report may with content of TA related information and/or UE location information.

If the UE is not configured with event-triggered TA report in RRC connected mode (or the UE receives a configuration to disable/dis-configure event-triggered TA report in RRC connected mode), the UE does not evaluate the TA offset between the current TA and the TA included in the last TA report. The UE does not trigger (or generate) a TA report (e.g., in RRC connected mode) in response to receiving a configuration to de-configure TA report in RRC connected mode).

To solve the issue, the UE could determine whether to use a first TA as the last reported TA for reporting event, e.g., in response to (or upon) receiving a configuration to configure TA report in RRC connected mode, based on at least one or more conditions being fulfilled. The UE could determine whether to evaluate the TA offset between the current TA and a first TA (or evaluate the TA offset between the current TA and the last reported TA (e.g., the TA included in the last TA report)) for reporting event, e.g., in response to (or upon) receiving a configuration to configure TA report in RRC connected mode, based on at least one or more conditions being fulfilled.

The UE could (determine to) use the first TA as the last reported TA for reporting event if (at least) one or more conditions are fulfilled. The UE could determine not to use the first TA as the last reported TA for reporting event if (at least) one or more conditions are not fulfilled. The UE could evaluate the TA offset between the current TA and the first TA (in RRC connected mode) if (at least) one or more conditions are fulfilled. The UE could evaluate the TA offset between the current TA and the TA included in the last TA report (in RRC connected mode) if (at least) one or more conditions are not fulfilled. If the TA offset is larger than (or no smaller than) a configured TA offset threshold for the TA report in RRC connected mode, the UE triggers a TA report.

The condition may be (or include) one or more of the following:
- if (or whether) the TA report at/during RA procedure is enabled;
- if (or whether) the content of last reported TA is a second information (e.g., UE location information) or a first information (e.g., TA related information);
- if (or whether) the configuration to configure TA report in RRC connected mode is received in a HO command (e.g., RRCReconfiguration comprising reconfigurationWithSync);
- if (or whether) there is prior TA report (e.g., in the same cell);
- if (or whether) there is prior TA report (e.g., in the same cell) with content as TA related information;
- if (or whether) there is prior TA report (e.g., in the same cell) with content as UE location information;
- if (or whether) there is prior TA report (e.g., in the same cell) with content as the same information as the configured TA report in RRC connected mode;
- if (or whether) the configured TA report content in the configuration to configure TA report in RRC connected mode is the same as the content of the prior TA report (e.g., in the same cell); and/or
- if (or whether) there is prior TA report in (current) RRC connected mode.

In some examples, the UE could determine whether to use a first TA (or a last reported TA) for reporting event (for TA report in RRC connected mode), based on whether TA report at/during RA procedure is enabled or not.

Case 1: TA Report at/During RA Procedure is Disabled, and TA Report (with a First Information and/or Second Information) in RRC Connected Mode is Configured.

The UE could use a first TA to calculate the TA offset in a reporting event (for TA report in RRC connected mode), if the TA report at/during RA procedure is not enabled (or is disabled). For example, as shown in FIG. 5, the UE receives a first configuration (e.g., in a system information) indicating that the TA report at/during RA procedure is not enabled (or is disabled). The UE receives a second configuration (e.g., in a dedicated signaling) indicating/configuring the TA report with a first information and/or second information in RRC connected mode. In response to (or after) receiving the second configuration (e.g., in the dedicated signaling) (e.g., with the configuration of TA report in RRC connected mode), the UE may evaluate the difference between current TA and the first TA for a reporting event. The UE may trigger a TA report when/upon the reporting event is fulfilled (e.g., the difference between current TA and the first TA is above a configured threshold). The reporting event may be fulfilled/triggered when the change/difference/offset of UE TA between the current information about UE TA and the last reported information about UE TA (or between the current information about UE TA and the first TA) is larger/not smaller than a configured threshold. The UE may trigger a TA report when the change/difference/offset of UE TA between the current information about UE TA and the last reported information about UE TA (or between the current information about UE TA and the first TA) is larger/not smaller than a configured threshold.

Case 2: TA Report at/During RA Procedure is Enabled, and TA Report (with a First Information or Second Information) in RRC Connected Mode is Configured.

The UE could use the last reported TA to calculate the TA offset in a reporting event (for TA report in RRC connected mode), if the TA report at/during RA procedure is enabled (or is disabled). For example, as shown in FIG. 6, the UE receives a first configuration (e.g., in a system information) indicating that the TA report at/during RA procedure is enabled. The UE receives a second configuration (e.g., in a dedicated signaling) indicating/configuring the TA report with a first information and/or second information in RRC connected mode. In response to (or after) receiving the second configuration (e.g., in the dedicated signaling) (e.g., with the configuration of TA report in RRC connected mode), the UE may evaluate the difference between current TA and the TA reported in the TA report at/during RA procedure for a reporting event. The UE may trigger a TA report when/upon the reporting event is fulfilled (e.g., the difference between current TA and the last reported TA is above a configured threshold). The reporting event may be fulfilled/triggered when the change/difference/offset of UE TA between the current information about UE TA and the last reported information about UE TA (or between the current information about UE TA and the first TA) is larger/not smaller than a configured threshold. The UE may trigger a TA report when the change/difference/offset of UE TA between the current information about UE TA and the last reported information about UE TA (or between the current information about UE TA and the first TA) is larger/not smaller than a configured threshold.

In some examples, the UE could determine whether to use a first TA (or a last reported TA) for reporting event (for TA report in RRC connected mode), based on whether TA report at/during RA procedure is enabled or not and whether the content of last reported TA (e.g., the last reported information about UE TA) (e.g., in a serving cell of the UE, in PCell of the UE) is UE location information or TA related information.

Case 3: TA Report at/During RA Procedure is Disabled, TA Report in RRC Connected Mode is not Configured (or Dis-Configured), then TA Report (with a First Information and/or Second Information) in RRC Connected Mode is Configured/Reconfigured.

The UE could (determine to) use a first TA to calculate the TA offset in a reporting event (for TA report in RRC connected mode), if there is no prior TA report (e.g., in the same cell). For example, as shown in FIG. 7, the UE receives a first configuration (e.g., in a system information) indicating that the TA report at/during RA procedure is not enabled (or is disabled). The UE receives a second configuration (e.g., in a first dedicated signaling) indicating/configuring the TA report is not configured in RRC connected mode. Then the UE receives another second configuration (e.g., a third configuration) (e.g., in a second dedicated signaling) indicating/configuring the TA report with a first information and/or second information in RRC connected mode. In response to (or after) receiving the (latter) second configuration (e.g., the third configuration) (e.g., in the second dedicated signaling) configuring the TA report in RRC connected mode, the UE may evaluate the difference between current TA and the first TA for a reporting event. The UE may trigger a TA report when/upon a reporting event is fulfilled/triggered in RRC connected mode. The reporting event may be fulfilled/triggered when the change/difference/offset of UE TA between the current information about UE TA and the first TA is larger/not smaller than a configured threshold. The UE may trigger a TA report when the change/difference/offset of UE TA between the current information about UE TA and the first TA is larger/not smaller than a configured threshold.

Case 4-1: TA Report at/During RA Procedure is Disabled, TA Report (with a Second Information) in RRC Connected Mode is Configured, then TA Report (with a First Information) in RRC Connected Mode is Configured/Reconfigured.

The UE could (determine to) use a first TA to calculate the TA offset in a reporting event (for TA report in RRC connected mode), if there is no prior TA report with the same content of information (e.g., in the same cell) as indicated/configured by the configuration. For example, as shown in FIG. 8, the UE receives a first configuration (e.g., in a system information) indicating that the TA report at/during RA procedure is not enabled (or is disabled). The UE receives a second configuration (e.g., in a first dedicated signaling) indicating/configuring the TA report with second information in RRC connected mode. Then the UE receives another second configuration (e.g., a third configuration) (e.g., in a second dedicated signaling) indicating/configuring the TA report with first information in RRC connected mode. In response to (or after) receiving the (latter) second configuration (e.g., the third configuration) (e.g., in the second dedicated signaling) configuring the TA report with first information in RRC connected mode, the UE may evaluate the difference between current TA and the first TA for a reporting event. In response to (or after) receiving the (latter) second configuration (e.g., the third configuration) (e.g., in the second dedicated signaling) configuring the TA report with first information in RRC connected mode, the UE may evaluate the difference between current TA and the last reported information about UE for a reporting event. The UE may trigger a TA report when/upon a reporting event is fulfilled/triggered in RRC connected mode. The reporting event may be fulfilled/triggered when the change/difference/offset of UE TA between the current information about UE TA (e.g., a first information) and the last reported information about UE TA (e.g., a first and/or second information) is larger/not smaller than a configured threshold. The UE may trigger a TA report when the change/difference/offset of UE TA between the current information about UE TA (e.g., a first information) and the last reported information (e.g., a first and/or second information) about UE TA is larger/not smaller than a configured threshold.

Case 4-2: TA Report at/During RA Procedure is Disabled, TA Report (with a First Information) in RRC Connected Mode is Configured, then TA Report (with a Second Information) in RRC Connected Mode is Configured/Reconfigured.

The UE could (determine to) use a first TA to calculate the TA offset in a reporting event (for TA report in RRC connected mode), if there is no prior TA report with the same content of information (e.g., in the same cell) as indicated/configured by the configuration. For example, as shown in FIG. 9, the UE receives a first configuration (e.g., in a system information) indicating that the TA report at/during RA procedure is not enabled (or is disabled). The UE receives a second configuration (e.g., in a first dedicated signaling) indicating/configuring the TA report with first information in RRC connected mode. Then the UE receives another second configuration (e.g., a third configuration) (e.g., in a second dedicated signaling) indicating/configuring the TA report with second information in RRC connected mode. In response to (or after) receiving the (latter) second configuration (e.g., the third configuration) (e.g., in the second dedicated signaling) configuring the TA report with second information in RRC connected mode, the UE may evaluate the difference between current TA and the first TA for a reporting event. In response to (or after) receiving the (latter) second configuration (e.g., the third configuration) (e.g., in the second dedicated signaling) configuring the TA report with second information in RRC connected mode, the UE may evaluate the difference between current TA and the last reported information about UE TA for a reporting event. The UE may trigger a TA report when/upon a reporting event is fulfilled/triggered in RRC connected mode. The reporting event may be fulfilled/triggered when the change/difference/offset of UE TA between the current information about UE TA (e.g., a second information) and the last reported information about UE TA (e.g., a first and/or second information) is larger/not smaller than a configured threshold. The UE may trigger a TA report when the change/difference/offset of UE TA between the current information about UE TA (e.g., a second information) and the last reported information (e.g., a first and/or second information) about UE TA is larger/not smaller than a configured threshold.

Case 5: TA Report at/During RA Procedure is Enabled, TA Report in RRC Connected Mode is not Configured (or Dis-Configured), then TA Report (with a First Information and/or Second Information) in RRC Connected Mode is Configured/Reconfigured.

The UE could (determine to) use a first TA to calculate the TA offset in a reporting event (for TA report in RRC connected mode), if there is no prior TA report with the same content of information (e.g., in the same cell) as indicated/configured by the configuration and/or if there is no prior TA report in (current) RRC connected mode. For example, as shown in FIG. 10, the UE receives a first configuration (e.g., in a system information) indicating that the TA report at/during RA procedure is enabled. The UE receives a second configuration (e.g., in a first dedicated signaling) indicating/configuring the TA report is not configured in RRC connected mode. Then the UE receives another second configuration (e.g., a third configuration) (e.g., in a second dedicated signaling) indicating/configuring the TA report with a first information and/or second information in RRC connected mode. In response to (or after) receiving the (latter) second configuration (e.g., the third configuration) (e.g., in the second dedicated signaling) configuring the TA report in RRC connected mode, the UE may evaluate the difference between current TA and the first TA for a reporting event. In response to (or after) receiving the (latter) second configuration (e.g., the third configuration) (e.g., in the second dedicated signaling) configuring the TA report in RRC connected mode, the UE may evaluate the difference between current TA and the reported information about UE TA at/during RA procedure for a reporting event. The UE may trigger a TA report when/after a reporting event is fulfilled/triggered in RRC connected mode. The reporting event may be fulfilled/triggered when the change/difference/offset of UE TA between the current information about UE TA and the last reported information about UE TA is larger/not smaller than a configured threshold. The UE may trigger a TA report when the change/difference/offset of UE TA between the current information about UE TA and the last reported information about UE TA (and/or the last TA) is larger/not smaller than a configured threshold. The last reported information about UE TA may be the first information and/or second information reported in RRC connected mode. The last reported information about UE TA may be the information reported in the TA report at/during RA procedure.

Case 6-1: TA Report at/During RA Procedure is Enabled, TA Report (with a Second Information) in RRC Connected Mode is Configured, then TA Report (with a First Information) in RRC Connected Mode is Configured/Reconfigured.

The UE could (determine to) use a first TA to calculate the TA offset in a reporting event (for TA report in RRC connected mode), if there is no prior TA report with the same content of information (e.g., in the same cell) as indicated/configured by the configuration. For example, as shown in FIG. 11, the UE receives a first configuration (e.g., in a system information) indicating that the TA report at/during RA procedure is enabled. The UE receives a second configuration (e.g., in a first dedicated signaling) indicating/configuring the TA report with second information in RRC connected mode. Then the UE receives another second configuration (e.g., a third configuration) (e.g., in a second dedicated signaling) indicating/configuring the TA report with first information in RRC connected mode. In response to (or after) receiving the (latter) second configuration (e.g., the third configuration) (e.g., in the second dedicated signaling) configuring the TA report with first information in RRC connected mode, the UE may evaluate the difference between current TA and the first TA for a reporting event. In response to (or after) receiving the (latter) second configuration (e.g., the third configuration) (e.g., in the second dedicated signaling) configuring the TA report with first information in RRC connected mode, the UE may evaluate the difference between current TA and the last reported information about UE TA for a reporting event. The UE may trigger a TA report when/after a reporting event is fulfilled/triggered in RRC connected mode. The reporting event may be fulfilled/triggered when the change/difference/offset of UE TA between the current information about UE TA (e.g., a first information) and the last reported information about UE TA (e.g., a first and/or second information) is larger/not smaller than a configured threshold. The UE may trigger a TA report when the change/difference/offset of UE TA between the current information about UE TA (e.g., a first information) and the last reported information (e.g., a first and/or second information) about UE TA is larger/not smaller than a configured threshold. The last reported information about UE TA may be the information reported in RRC connected mode. The last reported information about UE TA may be the information reported in the TA report at/during RA procedure.

Case 6-2: TA Report at/During RA Procedure is Enabled, TA Report (with a First Information) in RRC Connected Mode is Configured, then TA Report (with a Second Information) in RRC Connected Mode is Configured/Reconfigured.

The UE could (determine to) use a first TA to calculate the TA offset in a reporting event (for TA report in RRC connected mode), if there is no prior TA report with the same content of information (e.g., in the same cell) as indicated/configured by the configuration. For example, as shown in FIG. 12, the UE receives a first configuration (e.g., in a system information) indicating that the TA report at/during RA procedure is not enabled (or is disabled). The UE receives a second configuration (e.g., in a first dedicated signaling) indicating/configuring the TA report with first information in RRC connected mode. Then the UE receives another second configuration (e.g., a third configuration) (e.g., in a second dedicated signaling) indicating/configuring the TA report with second information in RRC connected mode. In response to (or after) receiving the (latter) second configuration (e.g., the third configuration) (e.g., in the second dedicated signaling) configuring the TA report with second information in RRC connected mode, the UE may evaluate the difference between current TA and the first TA for a reporting event. In response to (or after) receiving the (latter) second configuration (e.g., the third configuration) (e.g., in the second dedicated signaling) configuring the TA report with second information in RRC connected mode, the UE may evaluate the difference between current TA and the last reported information about UE TA for a reporting event. The UE may trigger a TA report when/after a reporting event is fulfilled/triggered in RRC connected mode. The UE may trigger the TA report regardless of current TA value (e.g., without considering whether the reporting event is fulfilled). The reporting event may be fulfilled/triggered when the change/difference/offset of UE TA between the current information about UE TA (e.g., a second information) and the last reported information about UE TA (e.g., a first and/or second information) is larger/not smaller than a configured threshold. The UE may trigger a TA report when the change/difference/offset of UE TA between the current information about UE TA (e.g., a second information) and the last reported information (e.g., a first and/or second information) about UE TA is larger/not smaller than a configured threshold.

In some examples, whether to use a first TA (or a last reported TA) for reporting event (for TA report in RRC connected mode), based on whether the configuration is received in a HO command. The HO command is a RRC message indicating reconfiguration with sync and/or handover (e.g., a RRCReconfiguration comprising reconfigurationWithSync). A first configuration (e.g., for the TA report at/during RA procedure) and a second configuration (e.g., for TA report in RRC connected mode) are included in the HO command. The HO command comprises the first configuration and second configuration.

Case 7: TA Report (with a First Information and/or Second Information) in RRC Connected Mode is Configured in a HO Command.

The UE could use a first TA to calculate the TA offset in a reporting event (for TA report in RRC connected mode), if the TA report in RRC connected mode is configured in a HO command (e.g., RRCReconfiguration with reconfiguration-WithSync). For example, as shown in FIG. 13, the UE receives a HO command comprising a first configuration (e.g., in a system information) and a second configuration (e.g., in a dedicated signaling). The first configuration may indicate that the TA report at/during RA procedure is not enabled (or is disabled). The second configuration may indicate/configure the TA report with a first information and/or second information in RRC connected mode. In response to (or after) receiving the HO command (e.g., with the configuration of TA report in RRC connected mode), the UE may evaluate the difference between current TA and the first TA for a reporting event. The UE may initiate a RA procedure for HO in response to receiving the HO command. The UE may evaluate the difference between current TA and the first TA for a reporting event after the RA procedure. The UE may trigger a TA report when/upon the reporting event is fulfilled/triggered (e.g., the difference between current TA and the first TA is above a configured threshold). The reporting event may be fulfilled/triggered when the change/difference/offset of UE TA between the current information about UE TA and the last reported information about UE TA (or between the current information about UE TA and the first TA) is larger/not smaller than a configured threshold. The UE may trigger a TA report when the change/difference/offset of UE TA between the current information about UE TA and the last reported information about UE TA (or between the current information about UE TA and the first TA) is larger/not smaller than a configured threshold.

Alternatively and/or additionally, the UE could use a first TA as the last reported TA for reporting event in RRC connected mode based on at least whether the UE has transmitted a TA report (e.g., in a serving cell of the UE, in PCell of the UE, after the last RRC connection procedure, and/or after the last handover). The RRC connection procedure may be triggered by initial access, RRC Connection Resume, RRC Connection Re-establishment and/or synchronous reconfiguration.

For example, the UE evaluates the TA offset between the current TA and the first TA if the UE has not transmitted (or generated) a TA report before (e.g., in the same RRC connection, in the same cell). The UE evaluates the TA offset between the current TA and the TA included in the last TA report if the UE has transmitted (or generated) a TA report before (e.g., in the same RRC connection, in the same cell).

The first TA may be derived/calculated by the UE at a specific (or reference) timing. The specific (or reference) timing may be one (or include) the time when the UE receives a configuration (e.g., the second configuration) to configure a TA report in RRC connected mode. The specific (or reference) timing may be one (or include) the last time when the UE receives a TA command (e.g., Timing Advance Command MAC CE, Absolute Timing Advance Command MAC CE). The specific (or reference) timing may be one (or include) the time when the UE receives a RAR and/or MSGB in a RA procedure. The first TA may be a UE derived/calculated TA when the UE received the configuration (e.g., a dedicated signaling) to configure TA report in RRC connected mode. The first TA may be the TA received in a TA command (e.g., Timing Advance Command MAC CE, Absolute Timing Advance Command MAC CE).

The first TA may be a common TA received from NW. The common TA may be received in a NTN specific SIB from NW. The common TA may be received and/or applied by the UEs in the same NTN cell. The first TA may be a dedicated TA received from NW. The first TA may be a full TA (e.g., used by the UE). The first TA may be a component or combination of the components in the UE's TA formula as specified in [4] R2-2111221, "LS on UE TA reporting", (i.e., $T_{TA}=(N_{TA}+N_{TA,UE\text{-}specific}+N_{TA,common}+N_{TA,offset})\times T_c$) and a K offset. The K offset may be k_offset and/or k_mac.

Throughout the disclosure, one, some, and/or all instances of "TA" may correspond to, may be supplemented with and/or may be replaced by "UE TA", "UE specific TA", "UE specific TA pre-compensation", and/or "information about UE TA". The "information about UE TA" may be or be replaced by "UE's TA" or "UE TA". The TA may be the TA of the UE and/or the TA calculated/estimated/used by the UE. Throughout the disclosure, one, some, and/or all instances of "TA report" may correspond to, may be supplemented with and/or may be replaced by "UE TA report", "UE specific TA report" and/or "report". The TA report may be a TA report estimated/calculated and/or reported by the UE. The TA report may be used for timing advance alignment, scheduling adaption and/or timing related configuration (e.g., K offset) by the NW.

The content of the TA report (e.g., information related to UE specific TA report, information about UE TA, UE specific TA pre-compensation, UE TA) would be TA related information (e.g., the first information) and/or UE location information (e.g., the second information). The content of the TA report may be calculated using the UE position and the serving satellite ephemeris. The TA related information may be a full TA (e.g., used by the UE), UE-specific TA, UE's service link TA, and/or the difference between full TA and the cell-specific K offset. The TA related information may be a component or combination of the components in the UE's TA formula as specified in [4] R2-2111221, "LS on UE TA reporting", (i.e., $T_{TA}=(N_{TA}+N_{TA,UE\text{-}specific}+N_{TA,common}+N_{TA,offset})\times T_c$) and a K offset. The K offset may be k_offset and/or k_mac. The full TA may be $T_{TA}$ and/or $T_{TA}+K$ offset.

The information about UE TA, UE specific TA, UE TA and/or TA as mentioned about may be the TA value of the UE. The information about UE TA, UE specific TA, UE TA and/or TA as mentioned about may be full TA of the UE, e.g., $T_{TA}$. Throughout the disclosure, the TA report may be a TA Report MAC CE.

Throughout the disclosure, the reporting event may correspond to, may be supplemented with and/or may be replaced by a triggering event. The reporting event and/or triggering event may be the event to trigger TA report (in RRC connected mode). The reporting event and/or triggering event may be configured and/or enabled by the second configuration, e.g., via dedicated signaling. The second configuration may be or may configure a TA offset threshold, e.g., for the event-triggered TA report.

Throughout the disclosure, the TA report at/during RA (procedure) may be a TA report triggered due to (or by) a RA procedure. The TA report at/during RA (procedure) may be configured and/or enabled by the first configuration, e.g., via system information. The TA report at/during RA (procedure) may be a TA report enabled and/or triggered during a RA procedure related to a first event. The TA report at/during RA (procedure) may be triggered during a RA procedure and/or a procedure triggering the RA procedure (e.g., procedure of first event, procedure of initial access, RRC establishment procedure). The TA report at/during RA (procedure) may be transmitted during the RA procedure and/or a subsequent transmission after the RA procedure, e.g., in Msg3/MSGA or Msg5.

The UE location information may be a coarse and/or finer location information. The UE location information may be GNSS coordinate(s) and/or part of GNSS coordinate(s). The UE location information may be reported based on user consent.

The UE may be configured by a dedicated signaling to report UE location information and/or TA related information for the purpose of TA reporting in RRC connected mode. The dedicated signaling may be a RRC configuration. The dedicated signaling may be a RRC message (e.g., RRCReestablishment, RRCReconfiguration, RRCConnectionReconfiguration, RRCResume, RRCSetup), MAC CE and/or Layer 1 indication. If UE location information is reported in TA report (e.g., in connected mode), RRC signaling is used to report. If TA related information is reported in TA report (e.g., during/at RA procedure and/or in connected mode), MAC CE is used to report.

The RRC signaling used for TA report (e.g., with content of UE location information) may be a RRC message (e.g., MeasurementReport, RRCReconfigurationComplete). The MAC CE used for TA report (e.g., with content of TA related information) may be a UE-Specific TA Report MAC CE as specified in the running MAC CR after RAN2 #116 meeting (e.g., [2] 3GPP TR 38.821 V16.0.0). The UE-Specific TA Report MAC CE may have a fixed size and consists of a single field containing the UE estimate of the UE-specific TA (e.g., the TA related information). The UE-Specific TA Report MAC CE may be transmitted during/at a RA procedure (and/or the subsequent transmission of a RA procedure) which is not initiated for SI request.

The TA report during/at RA procedure may be referred to (or replaced by) the TA report that is triggered by (or in response to/due to) initiation of a RA procedure or reception of the first successfully received RAR (random access response) within a RA procedure.

The TA report during/at RA procedure may be configured by a configuration in system information (e.g., by enableTA-report in a system information). The configuration may apply to the TA report in RRC connected mode. The configuration may not apply to the TA report in RRC connected mode. The content of the TA report during/at RA procedure may be different from the content of the TA report in RRC connected mode.

The TA report during/at RA procedure may be transmitted in a RA procedure and/or subsequent transmission(s) after a RA procedure. The TA report during/at a RA procedure may be transmitted in a Msg3/MsgA or Msg5. The MAC CE for TA report (e.g., UE-Specific TA Report MAC CE) would be transmitted in Msg3/MsgA or Msg5, depending on the TB size of Msg3, MsgA and/or Msg5. The Msg5 may be a subsequent UL transmission after a RA procedure is completed. The Msg5 may be an UL transmission of/with a RRC message (e.g., RRCSetupComplete, RRCResumeComplete).

For example, in a 2-step RA procedure, in response to initiating the RA, the UE indicates the Multiplexing and assembly entity to include a UE-Specific TA Report MAC CE in subsequent UL transmission if the TA report is enabled by system information. The UE may transmit the UE-Specific TA Report MAC CE in a MSGA or the UL transmission (e.g., scheduling by NW) after a MSGA transmission.

For example, in a 4-step RA procedure, in response to receiving a RAR (e.g., a Downlink (DL) assignment has been received on the PDCCH for the RA-RNTI and the received TB is successfully decoded), the UE indicates the Multiplexing and assembly entity to include a UE-Specific TA Report MAC CE in the subsequent UL transmission if the TA report is enabled by system information. the UE may transmit the UE-Specific TA Report MAC CE in a Msg3 or the UL transmission (e.g., scheduling by NW) after a Msg3 transmission.

Throughout the disclosure, one, some, and/or all the "RA procedure" may be triggered/initiated for initial access and/or in RRC connected mode. Throughout the disclosure, one, some, and/or all the "RA" and/or "RA procedure" may be triggered/initiated by a first event and/or a second event. The RA procedure may be triggered/initiated by a first event but not triggered/initiated by a second event. Throughout the disclosure, one, some, and/or all the "RA procedure" may be triggered/initiated for the purpose of a first event and/or a second event. The RA procedure may be triggered/initiated for the purpose of a first event but not triggered/initiated for the purpose of a second event.

The first event may be one or more of the following:
initial access and/or RRC (Connection) Establishment (e.g., from RRC idle mode to RRC connected mode);
RRC (Connection) Resume (e.g., from RRC inactive mode to RRC connected mode);
RRC (Connection) Re-establishment (e.g., in RRC connected mode); and/or
synchronous reconfiguration, reconfiguration with sync and/or handover (e.g., in RRC connected mode).

The second event may be one or more of the following:
DL and/or UL data arrival (e.g., when UL is non-synchronized in RRC connected mode);
UL data arrival (e.g., when there are no Physical Uplink Control Channel (PUCCH) resources for SR available in RRC connected mode);
Scheduling Request (SR) failure (e.g., in RRC connected mode);
establishing time alignment for a secondary TAG (e.g., in RRC connected mode);
beam failure recovery (e.g., in RRC connected mode); and/or
Listen-Before-Talk (LBT) failure on Special Cell (SpCell) (e.g., in RRC connected mode).

The system information may be a Master Information Block (MIB) and/or a SIB. The system information may be a SIB specific to NTN (e.g., SIB19). The system information may enable and/or disable the TA reporting by a parameter (e.g., enableTA-Report) including in a RA configuration (e.g., RACH-Config Common). The parameter (e.g., enableTA-Report) may be present or absent. The parameter (e.g., enableTA-Report) may be enabled or disabled.

The TA report in RRC connected mode may be referred to (or replaced by) the TA report that is triggered by a reporting event (e.g., based on TA value, based on TA change from the last TA reporting, based on TA change compared to a configured threshold) when the UE is in RRC connected mode. The TA report in RRC connected mode may be referred to (or replaced by) the event-triggered TA report in RRC connected mode.

The TA report in RRC connected mode may be configured by a dedicated signaling. The dedicated signaling may apply to the TA report during/at RA procedure. The dedicated signaling may not apply to the TA report during/at RA procedure. The content of the TA report in RRC connected mode may be different from the content of the TA report during/at RA procedure.

The TA report in RRC connected mode may be transmitted in a Msg3/MsgA, Msg5, and/or RRC message (e.g., MeasurementReport). The TA report in RRC connected mode may be transmitted in a RA procedure (and/or subsequent transmission(s) for/after a RA procedure) triggered/initiated by one or more of the following events/purposes:

RRC Connection Re-establishment;
synchronous reconfiguration and/or handover;
DL data arrival (e.g., when UL is non-synchronized);
UL data arrival (e.g., when UL is non-synchronized, when there are no PUCCH resources for SR available);
SR failure;
establishing time alignment for a secondary TAG;
beam failure recovery; and/or
LBT failure on SpCell.

After receiving the configuration (e.g., the second configuration, in a dedicated signaling) of TA report in RRC connected mode (of event-triggered TA report), the UE would trigger a TA report when/upon (or in response to) a reporting event is fulfilled/triggered. The reporting event for TA report with the content of first information and the reporting event for TA report with the content of second information may be the same. The reporting event for TA report with the content of first information and the reporting event for TA report with the content of second information may be different. The reporting event may be based on TA (e.g., TA difference, TA offset). The (condition of the) reporting event may be a TA offset threshold between current information about UE TA and the last successfully reported information about UE TA. The reporting event may be triggered or fulfilled if/when the offset (or variation) between current information about UE TA and the last reported information about UE TA is larger than or equal to a TA offset threshold. The TA offset may be the difference between two TAs. The information about UE TA may be the first information and/or the second information. The information about UE TA may be the content reported to NW. The information about UE TA may be the representation of TA of a UE. The reporting event and the configuration of TA report in RRC connected mode may be configured in the same dedicated signaling. The reporting event and the configuration of TA report in RRC connected mode may be configured in different dedicated signaling. The reporting event may be fulfilled (or triggered) when the change (or difference, or offset) of UE TA between the current information about UE TA and the last reported information about UE TA (or between the current information about UE TA and the first TA) is larger than (or not smaller than) a configured threshold. The UE may trigger a TA report when the change (or difference, or offset) of UE TA between the current information about UE TA and the last reported information about UE TA (or between the current information about UE TA and the first TA) is larger than (or not smaller than) a configured threshold.

The UE may receive configurations related to UE TA report. The UE may receive one or more first configuration (e.g., in system information, for TA report at/during RA procedure) and/or second (and/or third) configuration (e.g., in dedicated signaling, for TA report in RRC connected mode). The UE may receive configuration to enable or disable TA report at/during RA procedure. The UE may receive configuration to enable or disable TA report in RRC connected mode. The UE may receive configuration to indicate the content (the first information and/or second information) of TA report in RRC connected mode. The UE may receive configuration of reporting event for TA report in RRC connected mode.

The UE may be in a cell of a NTN. The UE may be connected to a cell of a NTN. The UE may be connected to a LEO, GEO, MEO, HEO, and/or HAPS. Throughout the disclosure, a cell may be, may refer to a NTN cell.

The UE may refer to the UE or a MAC entity of the UE.

The UE may be a NR device. The UE may be a NR-light device. The UE may be a reduced capability device. The UE may be a mobile phone. The UE may be a wearable device. The UE may be a sensor. The UE may be a stationary device. The UE may be a LTE device. The UE may be a NB-IoT device. The UE may be an enhanced machine-type communication (eMTC) device.

The network may be a network node. The network may be a base station. The network may be an access point. The network may be an eNB. The network may be a gNB. The network may be a gateway.

Figure 15:
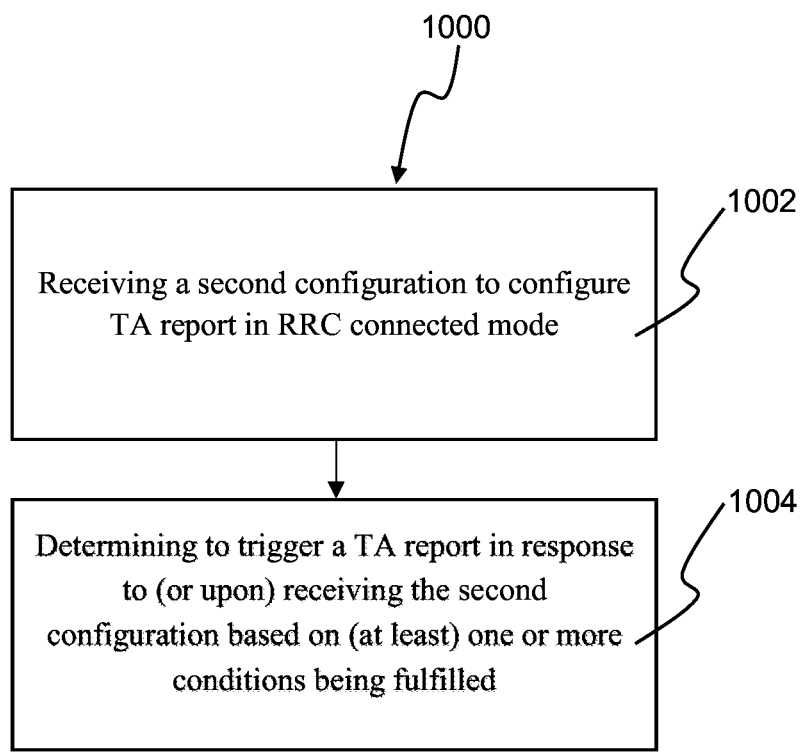
FIG. 15 is a flow diagram of a UE receiving a second configuration to configure TA report in RRC connected mode, in accordance with embodiments of the present invention.

Referring to FIG. 15 with this and other concepts, systems, and methods of the present invention, a method 1000 for a UE in a wireless communication system comprises receiving a second configuration to configure TA report in RRC connected mode (step 1002), and determining to trigger a TA report in response to (or upon) receiving the second configuration based on (at least) one or more conditions being fulfilled (step 1004).

In various embodiments, the condition may be whether the TA report at/during RA procedure is enabled or not.

In various embodiments, the condition may be whether there is prior TA report (e.g., in the same cell) or not.

Referring back to FIGS. 3 and 4, in one or more embodiments from the perspective of a UE, the device 300 includes a program code 312 stored in memory 310 of the transmitter. The CPU 308 could execute program code 312 to: (i) receive a second configuration to configure TA report in RRC connected mode, and (ii) determine to trigger a TA report in response to (or upon) receiving the second configuration based on (at least) one or more conditions being fulfilled. Moreover, the CPU 308 can execute the program code 312 to perform all of the described actions, steps, and methods described above, below, or otherwise herein.

Referring again back to FIGS. 3 and 4, in one or more embodiments from the perspective of a NW, the device 300 includes a program code 312 stored in memory 310 of the transmitter. The CPU 308 could execute program code 312 to: (i) transmit a second configuration to configure TA report in RRC connected mode and (ii) determine, at a UE, to trigger a TA report in response to (or upon) receiving the second configuration based on (at least) one or more conditions being fulfilled. Moreover, the CPU 308 can execute the program code 312 to perform all of the described actions, steps, and methods described above, below, or otherwise herein.

Figure 16:
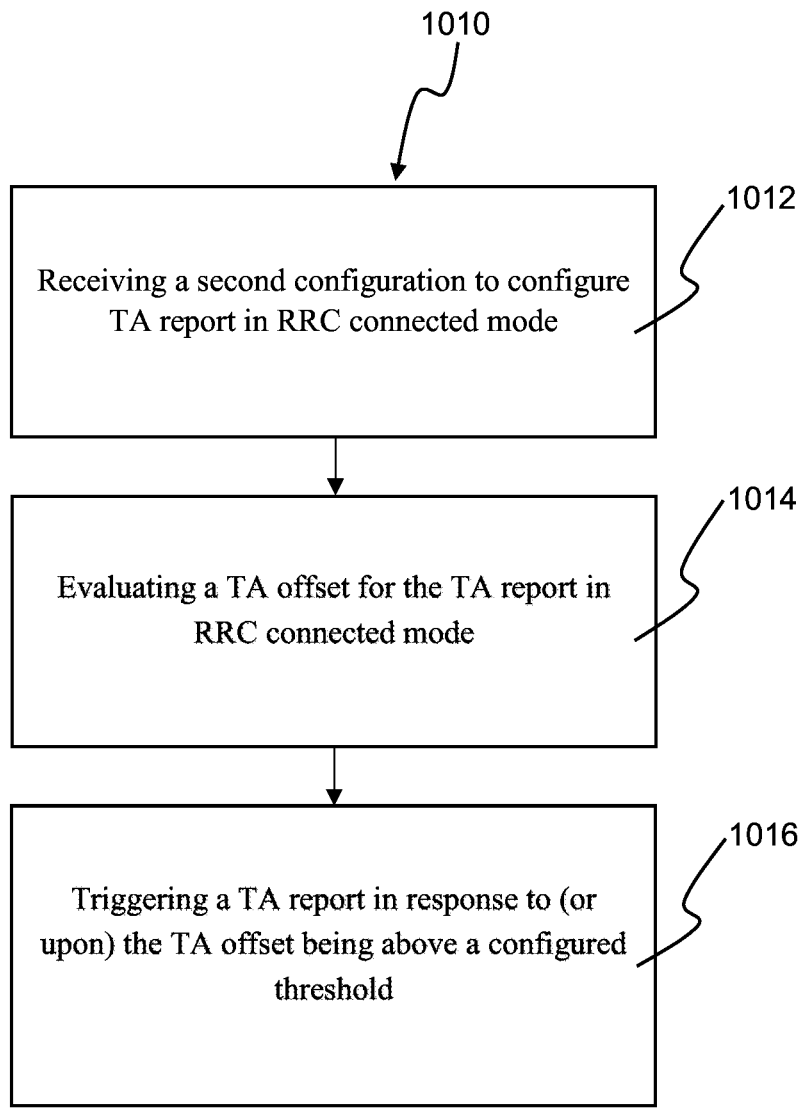
FIG. 16 is a flow diagram of a UE receiving a second configuration to configure TA report in RRC connect mode, in accordance with embodiments of the present invention.

Referring to FIG. 16, with this and other concepts, systems, and methods of the present invention, a method 1010 for a UE in a wireless communication system comprises receiving a second configuration to configure TA report in RRC connected mode (step 1012), evaluating a TA offset for the TA report in RRC connected mode (step 1014), and triggering a TA report in response to (or upon) the TA offset being above a configured threshold (step 1016).

In various embodiments, the TA offset is between the current TA and a first TA based on (at least) one or more conditions being fulfilled.

In various embodiments, the TA offset is between the current TA and the last reported TA based on (at least) one or more conditions being not fulfilled.

In various embodiments, the condition may be whether the TA report at/during RA procedure is enabled or not.

In various embodiments, the condition may be whether there is prior TA report (e.g., in the same cell) or not.

Referring back to FIGS. 3 and 4, in one or more embodiments from the perspective of a UE, the device 300 includes a program code 312 stored in memory 310 of the transmitter. The CPU 308 could execute program code 312 to: (i) receive a second configuration to configure TA report in RRC connected mode, (ii) evaluate a TA offset for the TA report in RRC connected mode, and (iii) trigger a TA report in response to (or upon) the TA offset being above a configured threshold. Moreover, the CPU 308 can execute the program code 312 to perform all of the described actions, steps, and methods described above, below, or otherwise herein.

Referring again back to FIGS. 3 and 4, in one or more embodiments from the perspective of a NW, the device 300 includes a program code 312 stored in memory 310 of the transmitter. The CPU 308 could execute program code 312 to: (i) transmit a second configuration to configure TA report in RRC connected mode, (ii) evaluate, at a UE, a TA offset for the TA report in RRC connected mode, and (iii) trigger, at the UE, a TA report in response to (or upon) the TA offset being above a configured threshold. Moreover, the CPU 308 can execute the program code 312 to perform all of the described actions, steps, and methods described above, below, or otherwise herein.

Figure 17:
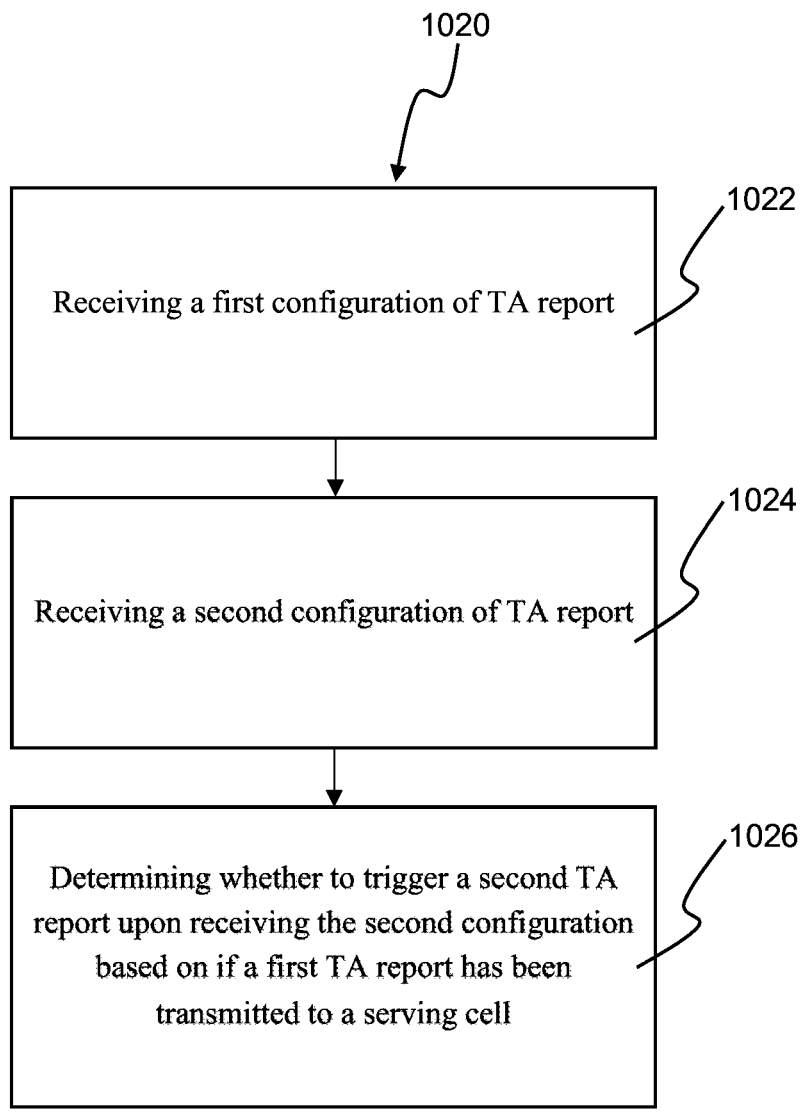
FIG. 17 is a flow diagram of a UE receiving a second configuration of TA report, in accordance with embodiments of the present invention.
Figure 18:
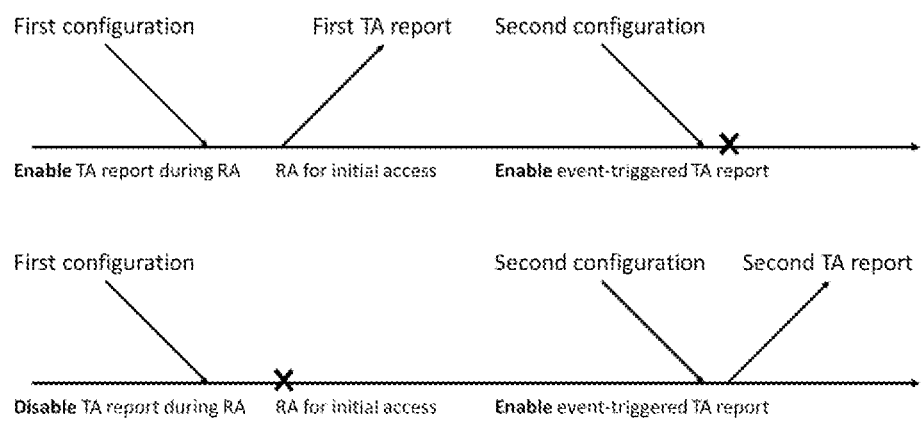
FIG. 18 is an example case/scenario diagram of a UE receiving a second configuration of TA report, in accordance with embodiments of the present invention.

Referring to FIG. 17, with this and other concepts, systems, and methods of the present invention, a method 1020 for a UE in a wireless communication system comprises receiving a first configuration of TA report (step 1022), receiving a second configuration of TA report (step 1024), and determining whether to trigger a second TA report upon receiving the second configuration based on if a first TA report has been transmitted to a serving cell (step 1026). An example is shown in FIG. 18.

In various embodiments, the method further comprises triggering the first TA report based on the first configuration being enabled, and not triggering the second TA report upon receiving the second configuration based on the first TA report having been transmitted to the serving cell. An example is shown in the upper part of FIG. 18.

In various embodiments, the method further comprises not triggering the first TA report based on the first configuration not being enabled, and triggering the second TA report upon receiving the second configuration based on the first TA report having not been transmitted to the serving cell. An example is shown in the lower part of FIG. 18.

In various embodiments, the first configuration is a configuration to enable TA report during RA for initial access, RRC connection resume, RRC connection reestablishment, and/or handover.

In various embodiments, the second configuration is a configuration to enable event-triggered TA report.

In various embodiments, the first TA report is transmitted to the serving cell during a RA procedure or subsequent transmission after the RA procedure.

In various embodiments, the RA procedure is related to procedure of initial access, RRC connection resume, RRC connection reestablishment or handover, and/or wherein the second configuration is received after the RA procedure.

In various embodiments, the method further comprises triggering a third TA report based on the second configuration if a TA offset between current TA information and TA information included in the first TA report is larger than or equal to a TA offset threshold.

In various embodiments, the TA report is a Timing Advance Report (TAR) MAC CE.

In various embodiments, the first configuration is received in a system information (e.g., SIB) and/or wherein the second configuration is received in a dedicated signaling (e.g., RRCReconfiguration message or RRCConnectionReconfiguration message).

Referring back to FIGS. 3 and 4, in one or more embodiments from the perspective of a UE, the device 300 includes a program code 312 stored in memory 310 of the transmitter. The CPU 308 could execute program code 312 to: (i) receive a first configuration of TA report, (ii) receive a second configuration of TA report, and (iii) determine whether to trigger a second TA report upon receiving the second configuration based on if a first TA report has been transmitted to a serving cell. Moreover, the CPU 308 can execute the program code 312 to perform all of the described actions, steps, and methods described above, below, or otherwise herein.

Referring again back to FIGS. 3 and 4, in one or more embodiments from the perspective of a NW, the device 300 includes a program code 312 stored in memory 310 of the transmitter. The CPU 308 could execute program code 312 to: (i) transmit a first configuration of TA report, (ii) transmit a second configuration of TA report, and (iii) determine, at a UE, whether to trigger a second TA report upon receiving the second configuration based on if a first TA report has been transmitted to a serving cell. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
receiving a first configuration of Timing Advance (TA) report in a system information;
receiving a second configuration of TA report; and
determining whether to trigger a second TA report upon receiving the second configuration based on whether a first TA report has been transmitted to a serving cell.

2. The method of claim 1, further comprising:
triggering the first TA report based on the first configuration being enabled; and
not triggering the second TA report upon receiving the second configuration based on the first TA report having been transmitted to the serving cell.

3. The method of claim 1, further comprising:
not triggering the first TA report based on the first configuration not being enabled; and
triggering the second TA report upon receiving the second configuration based on the first TA report having not been transmitted to the serving cell.

4. The method of claim 1, wherein the first configuration is a configuration to enable TA report during Random Access (RA) for initial access, Radio Resource Control (RRC) connection resume, RRC connection reestablishment, and/or handover.

5. The method of claim 1, wherein the second configuration is a configuration to enable event-triggered TA report.

6. The method of claim 1, wherein the first TA report is transmitted to the serving cell during a RA procedure or subsequent transmission after the RA procedure.

7. The method of claim 6, wherein the RA procedure is related to procedure of initial access, RRC connection resume, RRC connection reestablishment or handover, and/or wherein the second configuration is received after the RA procedure.

8. The method of claim 1, further comprising:
triggering a third TA report based on the second configuration if a TA offset between current TA information and TA information included in the first TA report is larger than or equal to a TA offset threshold.

9. The method of claim 1, wherein the TA report is a Timing Advance Report (TAR) Medium Access Control (MAC) Control Element (CE).

10. The method of claim 1, wherein the second configuration is received in a dedicated signaling, wherein the dedicated signaling is a RRCReconfiguration message or a RRCConnectionReconfiguration message.

11. A User Equipment (UE), comprising:
a memory; and
a processor operatively coupled to the memory, wherein the processor is configured to execute program code to:
receive a first configuration of Timing Advance (TA) report in a system information;
receive a second configuration of TA report; and
determine whether to trigger a second TA report upon receiving the second configuration based on whether a first TA report has been transmitted to a serving cell.

12. The UE of claim 11, wherein the processor is further configured to execute program code to:
trigger the first TA report based on the first configuration being enabled; and
not trigger the second TA report upon receiving the second configuration based on the first TA report having been transmitted to the serving cell.

13. The UE of claim 11, wherein the processor is further configured to execute program code to:
not trigger the first TA report based on the first configuration not being enabled; and
trigger the second TA report upon receiving the second configuration based on the first TA report having not been transmitted to the serving cell.

14. The UE of claim 11, wherein the first configuration is a configuration to enable TA report during Random Access (RA) for initial access, Radio Resource Control (RRC) connection resume, RRC connection reestablishment, and/or handover.

15. The UE of claim 11, wherein the second configuration is a configuration to enable event-triggered TA report.

16. The UE of claim 11, wherein the first TA report is transmitted to the serving cell during a RA procedure or subsequent transmission after the RA procedure.

17. The UE of claim 16, wherein the RA procedure is related to procedure of initial access, RRC connection resume, RRC connection reestablishment or handover, and/or wherein the second configuration is received after the RA procedure.

18. The UE of claim 11, wherein the processor is further configured to execute program code to:
trigger a third TA report based on the second configuration if a TA offset between current TA information and TA information included in the first TA report is larger than or equal to a TA offset threshold.

19. The UE of claim 11, wherein the TA report is a Timing Advance Report (TAR) Medium Access Control (MAC) Control Element (CE).

20. The UE of claim 11, wherein the second configuration is received in a dedicated signaling, wherein the dedicated signaling is a RRCReconfiguration message or a RRCConnectionReconfiguration message.

* * * * *